(12) United States Patent
Miyazawa et al.

(10) Patent No.: US 10,262,541 B2
(45) Date of Patent: Apr. 16, 2019

(54) CONVOY TRAVEL CONTROL APPARATUS

(71) Applicant: HONDA MOTOR CO., LTD., Minato-ku, Tokyo (JP)

(72) Inventors: Masako Miyazawa, Haga-gun (JP); Hiroyuki Tanabe, Haga-gun (JP); Michi Yamane, Haga-gun (JP); Naoto Sen, Haga-gun (JP); Junpei Yashima, Haga-gun (JP); Hideo Nakahama, Haga-gun (JP); Mahito Ishiyama, Haga-gun (JP); Takuji Hiroma, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 184 days.

(21) Appl. No.: 15/033,762

(22) PCT Filed: Oct. 1, 2014

(86) PCT No.: PCT/JP2014/076311
§ 371 (c)(1),
(2) Date: May 2, 2016

(87) PCT Pub. No.: WO2015/068502
PCT Pub. Date: May 14, 2015

(65) Prior Publication Data
US 2016/0267795 A1 Sep. 15, 2016

(30) Foreign Application Priority Data
Nov. 8, 2013 (JP) .................................. 2013-232240

(51) Int. Cl.
G08G 1/00 (2006.01)
B60W 30/12 (2006.01)
B60W 30/165 (2012.01)

(52) U.S. Cl.
CPC .............. G08G 1/22 (2013.01); B60W 30/12 (2013.01); B60W 30/165 (2013.01); B60W 2750/308 (2013.01)

(58) Field of Classification Search
CPC .............. B60W 30/12; B60W 30/165; B60W 2750/308; B60W 30/16; B60W 50/06;
(Continued)

(56) References Cited

U.S. PATENT DOCUMENTS 5,680,122 A * 10/1997 Mio .................... G05D 1/0246
180/167
5,781,119 A 7/1998 Yamashita et al.
(Continued)

FOREIGN PATENT DOCUMENTS

JP   H08-314541 A   11/1996
JP   H11-328584 A   11/1999
(Continued)

OTHER PUBLICATIONS

PCT/ISA/210 form PCT/JP2014/076311 with the English translation thereof.

*Primary Examiner* — Jerrah Edwards
(74) *Attorney, Agent, or Firm* — Carrier Blackman & Associates, P.C.; Joseph P. Carrier; Jeffrey T. Gedeon

(57) ABSTRACT

This convoy travel control apparatus includes: a communication portion; a travel control portion; and a joining control portion, wherein when an own vehicle is travelling in convoy, if the communication portion has received, from an independent vehicle not incorporated in group of convoy vehicles travelling in convoy, request information to incorporate the independent vehicle into the group of convoy vehicles, then the joining control portion determines a positional relationship between a position of the group of convoy vehicles and a position of the independent vehicle, and wherein according to the determined positional relationship, then the joining control portion exercises control, which is for incorporating the independent vehicle into the group of convoy vehicles, on the group of convoy vehicles via the communication portion.

19 Claims, 23 Drawing Sheets

(58) Field of Classification Search
CPC ..... B60W 2550/302; B60W 2550/408; B60W 2710/182; B60W 2720/106
See application file for complete search history.

(56) References Cited

U.S. PATENT DOCUMENTS

| | | | | |
|---|---|---|---|---|
| 8,380,389 | B2* | 2/2013 | Wright | G01M 17/04 |
| | | | | 342/42 |
| 8,600,609 | B2* | 12/2013 | Holzmann | B60W 30/16 |
| | | | | 180/170 |
| 8,762,042 | B2* | 6/2014 | Funabashi | G06F 17/00 |
| | | | | 340/903 |
| 9,202,379 | B2* | 12/2015 | Yamashiro | G08G 1/22 |
| 9,721,474 | B2* | 8/2017 | Eskilson | G08G 1/22 |
| 9,779,628 | B2* | 10/2017 | Yamashiro | G08G 1/22 |
| 2011/0130915 | A1* | 6/2011 | Wright | G01M 17/007 |
| | | | | 701/29.6 |
| 2012/0191318 | A1* | 7/2012 | Holzmann | B60W 30/16 |
| | | | | 701/96 |
| 2013/0261948 | A1* | 10/2013 | Funabashi | G06F 17/00 |
| | | | | 701/300 |
| 2014/0100734 | A1* | 4/2014 | Yamashiro | G08G 1/22 |
| | | | | 701/23 |
| 2014/0107867 | A1* | 4/2014 | Yamashiro | G08G 1/22 |
| | | | | 701/2 |
| 2015/0243172 | A1* | 8/2015 | Eskilson | G08G 1/22 |

FOREIGN PATENT DOCUMENTS

| | | |
|---|---|---|
| JP | 2001-006099 A | 1/2001 |
| JP | 2003-115095 A | 4/2003 |
| JP | 2003-121162 A | 4/2003 |
| JP | 2003-123180 A | 4/2003 |
| JP | 2005-001643 A | 1/2005 |
| JP | 2005-333226 A | 12/2005 |
| JP | 2006-261742 A | 9/2006 |
| JP | 2008-003675 A | 1/2008 |
| JP | 2008-234183 A | 10/2008 |
| JP | 2009-023560 A | 2/2009 |

* cited by examiner

CONVOY TRAVEL CONTROL APPARATUS

TECHNICAL FIELD

The present invention relates to a convoy travel control apparatus.

The present application claims priority based on Japanese Patent Application No. 2013-232240 filed on Nov. 8, 2013, the contents of which are incorporated herein by reference.

BACKGROUND ART

There is disclosed a convoy travel control apparatus that is capable of allowing an independent vehicle to merge with a group of convoy vehicles travelling in convoy (for example, see Patent Document 1).

RELATED ART DOCUMENT

Patent Document

Patent Document 1: Japanese Unexamined Patent Application, First Publication No. 2001-6099

SUMMARY

Problems to be Solved by the Invention

However, conventional convoy travel control apparatuses have a problem in that they are not capable of allowing an independent vehicle to speedily merge with a group of convoy vehicles.

Aspects of the present invention have been achieved in consideration of the aforementioned circumstances, and provide a convoy travel control apparatus capable of allowing an independent vehicle to speedily merge with a group of convoy vehicles.

Means for Solving the Problem (1) A convoy travel control apparatus according to aspects of the present invention includes: a communication portion that communicates with another vehicle; a travel control portion that actualizes travel in convoy with the another vehicle through communication via the communication portion; and a joining control portion, wherein when an own vehicle is travelling in convoy, if the communication portion has received, from an independent vehicle not incorporated in group of convoy vehicles travelling in convoy, request information to incorporate the independent vehicle into the group of convoy vehicles, then the joining control portion determines a positional relationship between a position of the group of convoy vehicles and a position of the independent vehicle, and wherein according to the determined positional relationship, then the joining control portion exercises control, which is for incorporating the independent vehicle into the group of convoy vehicles, on the group of convoy vehicles via the communication portion.

(2) In the convoy travel control apparatus as described above in (1), if the independent vehicle is travelling behind the group of convoy vehicles, then the joining control portion may decelerate the group of convoy vehicles, and wherein if the independent vehicle is travelling in front of the group of convoy vehicles, then the joining control portion may transmit, via the communication portion, information that requires to accelerate the group of convoy vehicles.

(3) The convoy travel control apparatus as described above in (1) or (2) may further include: a sensor portion that measures an inter-vehicular distance between the own vehicle and a preceding vehicle; an inter-vehicular distance control portion that controls a travel drive portion of the own vehicle so that the inter-vehicular distance measured by the sensor portion is a set distance; and a lane keeping control portion that controls a steering portion of the own vehicle so that the own vehicle does not deviate from a driving lane, wherein: the joining control portion may determine whether an inter-vehicular distance and a difference in speed between convoy vehicles incorporated in the group of convoy vehicles are within predetermined ranges or not, and wherein if the inter-vehicular distance and the difference in speed between the convoy vehicles are within the predetermined ranges, then the travel control portion may cause the own vehicle to travel in convoy based on control by the inter-vehicular distance control portion and on control by the lane keeping control portion.

(4) In the convoy travel control apparatus as described above in (3), if the own vehicle is travelling in convoy, then the travel control portion may order the inter-vehicular distance control portion to perform inter-vehicular distance control with the set distance shorter than a case where the own vehicle is not travelling in convoy.

(5) In the convoy travel control apparatus as described above in any one of (1) to (4), if the independent vehicle is travelling behind the group of convoy vehicles, then the joining control portion may generate information of speed change request that accelerates the independent vehicle, wherein if the independent vehicle is travelling in front of the group of convoy vehicles, then the joining control portion may generate information of speed change request that decelerates the independent vehicle, and wherein the joining control portion may transmit the generated information of speed change request to the independent vehicle via the communication portion.

(6) The convoy travel control apparatus as described above in any one of (1) to (5) may further include the sensor portion that measures the inter-vehicular distance between the own vehicle and the preceding vehicle, wherein: the joining control portion may calculate a position of the preceding vehicle based on the inter-vehicular distance measured by the sensor portion, and wherein if a distance between the calculated position of the preceding vehicle and a position of a convoy vehicle incorporated into the group of convoy vehicles is within a predetermined distance, then the joining control portion may determine that the preceding vehicle is the convoy vehicle.

(7) The convoy travel control apparatus as described above in any one of (1) to (6) may further include: a forward imaging portion that takes an image of the preceding vehicle; an image recognition portion that, based on an image taken by the forward imaging portion, recognizes an identification number allocated to the imaged preceding vehicle; and an identification information sharing portion that receives an identification number allocated to the convoy vehicle incorporated into the group of convoy vehicles, wherein if the identification number allocated to the imaged preceding vehicle matches with the identification number allocated to the convoy vehicle, then the joining control portion may determine that the imaged preceding vehicle is the convoy vehicle.

(8) The convoy travel control apparatus as described above in (3) or (4) may further include a state information sharing portion that receives information indicative of a state in front of or behind the group of convoy vehicles, wherein according to the information indicative of the state in front of or behind the group of convoy vehicles, the travel control portion may control travel of the group of convoy vehicles.

(9) In the convoy travel control apparatus as described above in (8), if the information indicative of the state in front of or behind the group of convoy vehicles is information indicative of a predetermined event, then the travel control portion may order the inter-vehicular distance control portion to change the inter-vehicular distance.

(10) In the convoy travel control apparatus as described above in (8) or (9), if the information indicative of the state in front of or behind the group of convoy vehicles is information indicative of a predetermined event, then the travel control portion may order the lane keeping control portion to change a position of the own vehicle with respect to a lane.

(11) The convoy travel control apparatus as described above in any one of (8) to (10) may further include a communication control portion, wherein if the communication portion receives at least either of image information in which an interior of the convoy vehicle incorporated in the group of convoy vehicles is taken and voice information collected from the interior of the convoy vehicle, then according to the information indicative of the state in front of or behind the group of convoy vehicles, the communication control portion may control the presentation portion so as to present at least either of the image information and the voice information.

(12) In the convoy travel control apparatus as described above in (11), the communication control portion may transmit voice information, which has been collected from the own vehicle, via the communication portion based on an operation input.

(13) The convoy travel control apparatus as described above in (11) may further include a storage portion that stores point information granted to a driver according to experience of driving the convoy vehicle, wherein the presentation portion may present the point information.

(14) In the convoy travel control apparatus as described above in (13), the storage portion may store the point information granted to the driver according to the experience that satisfies a preset condition.

(15) The convoy travel control apparatus as described above in any one of (1) to (14) may further include a position information sharing portion that receives information indicative of a trail of a preceding vehicle, wherein the travel control portion may cause an own vehicle to follow the trail.

Advantage of the Invention

According to the aspects of the present invention, in the convoy travel control apparatus, the joining control portion determines a positional relationship between a position of a group of convoy vehicles and a position of an independent vehicle and, according to the determined positional relationship, exercises control, which is for incorporating the independent vehicle into the group of convoy vehicles, on the group of convoy vehicles via the communication portion. As a result, it is possible to speedily merge the independent vehicle with the group of convoy vehicles.

DESCRIPTION OF THE EMBODIMENTS

First Embodiment

A first embodiment for carrying out the present invention will be described. Hereinafter, a vehicle capable of wirelessly communicating with other vehicles is referred to as "communication vehicle". Furthermore, any one of the vehicles that travel in convoy while maintaining some degree of distance between themselves by communicating with one another is referred to as "convoy vehicle". Of the vehicles incorporated in a group of convoy vehicles, the head of the convoy vehicles is referred to as "leading vehicle". Of the vehicles incorporated in the group of convoy vehicles, any one of the vehicles other than the leading vehicle is referred to as "follower vehicle". Of the vehicles incorporated in the group of convoy vehicles, the tail end of the convoy vehicles is referred to as "tail end vehicle". A vehicle travelling independently of the group of convoy vehicles is referred to as "independent vehicle".

In the first embodiment, a convoy travel control apparatus is described that helps an independent vehicle merge in front of the leading vehicle or behind the last vehicle, namely, merge with the group of convoy vehicles at its head or tail.

Figure 1:
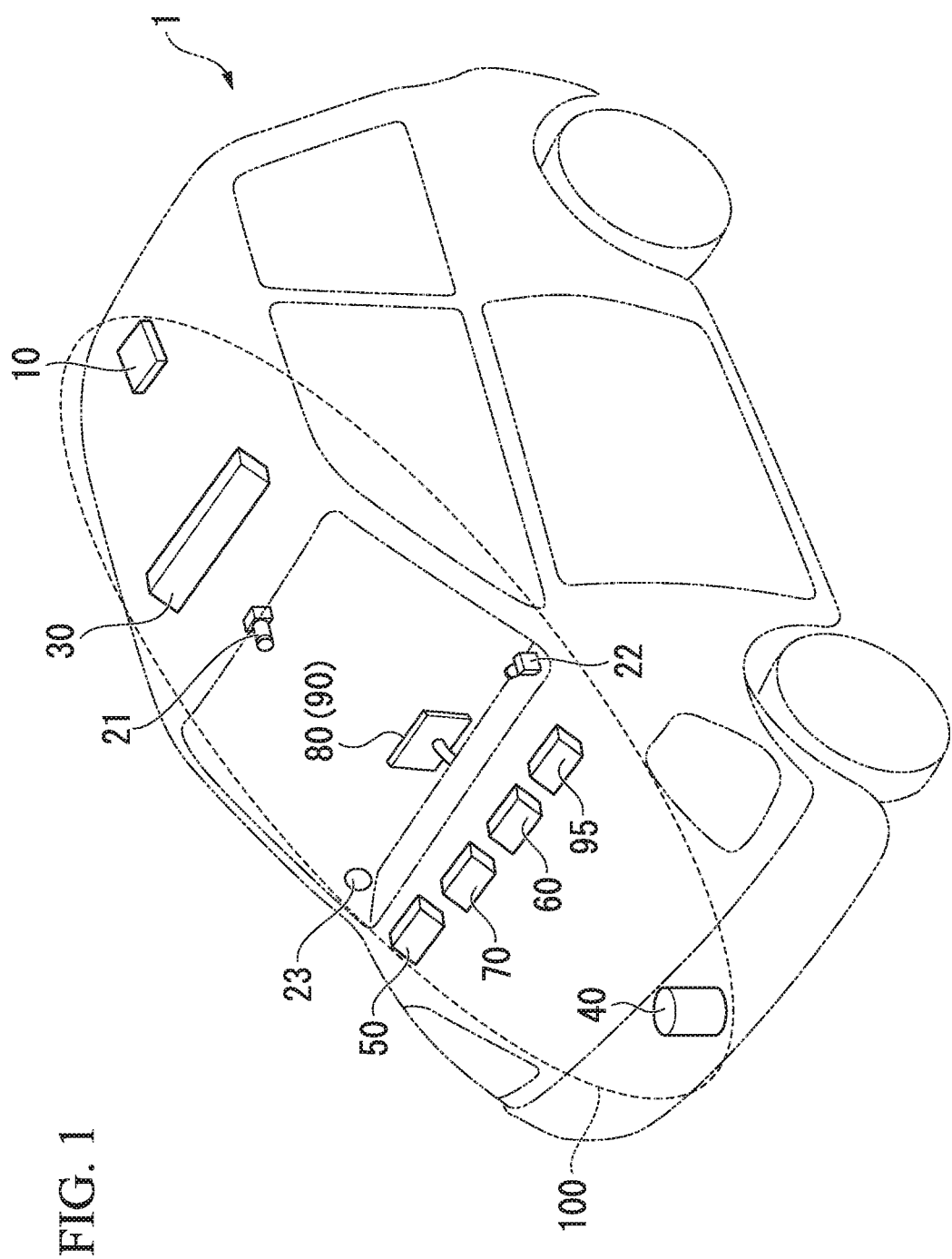
FIG. 1 is a perspective view showing an exemplary convoy travel control apparatus that is arranged in a communication vehicle, according to a first embodiment of the present invention.

FIG. 1 is a perspective view of an exemplary convoy travel control apparatus that is arranged in a communication vehicle. When mounted in a communication vehicle 1 and arranged in predetermined positions, a convoy travel control apparatus 100 moves together with the communication vehicle 1. Functional portions of the convoy travel control apparatuses 100 are capable of communicating with one another over the in-vehicle network of the communication vehicles 1. The in-vehicle network is constructed according to a protocol such as CAN (Controller Area Network).

The communication vehicle 1 supports a vehicle-to-vehicle communication, and hence, can be a convoy vehicle. On the other hand, the non-communication vehicle does not mount a convoy travel control apparatus 100. Therefore, the non-communication vehicle does not support a vehicle-to-vehicle communication, and hence, cannot be a convoy vehicle.

If, when its own vehicle is travelling in convoy, receiving request information to incorporate an independent vehicle into the group of convoy vehicles, then the convoy travel control apparatus 100 controls the travel of the group of convoy vehicles according to a positional relationship between a position of the group of convoy vehicles and a position of the independent vehicle, to thereby make it possible to speedily merge the independent vehicle with the group of convoy vehicles.

Figure 2:
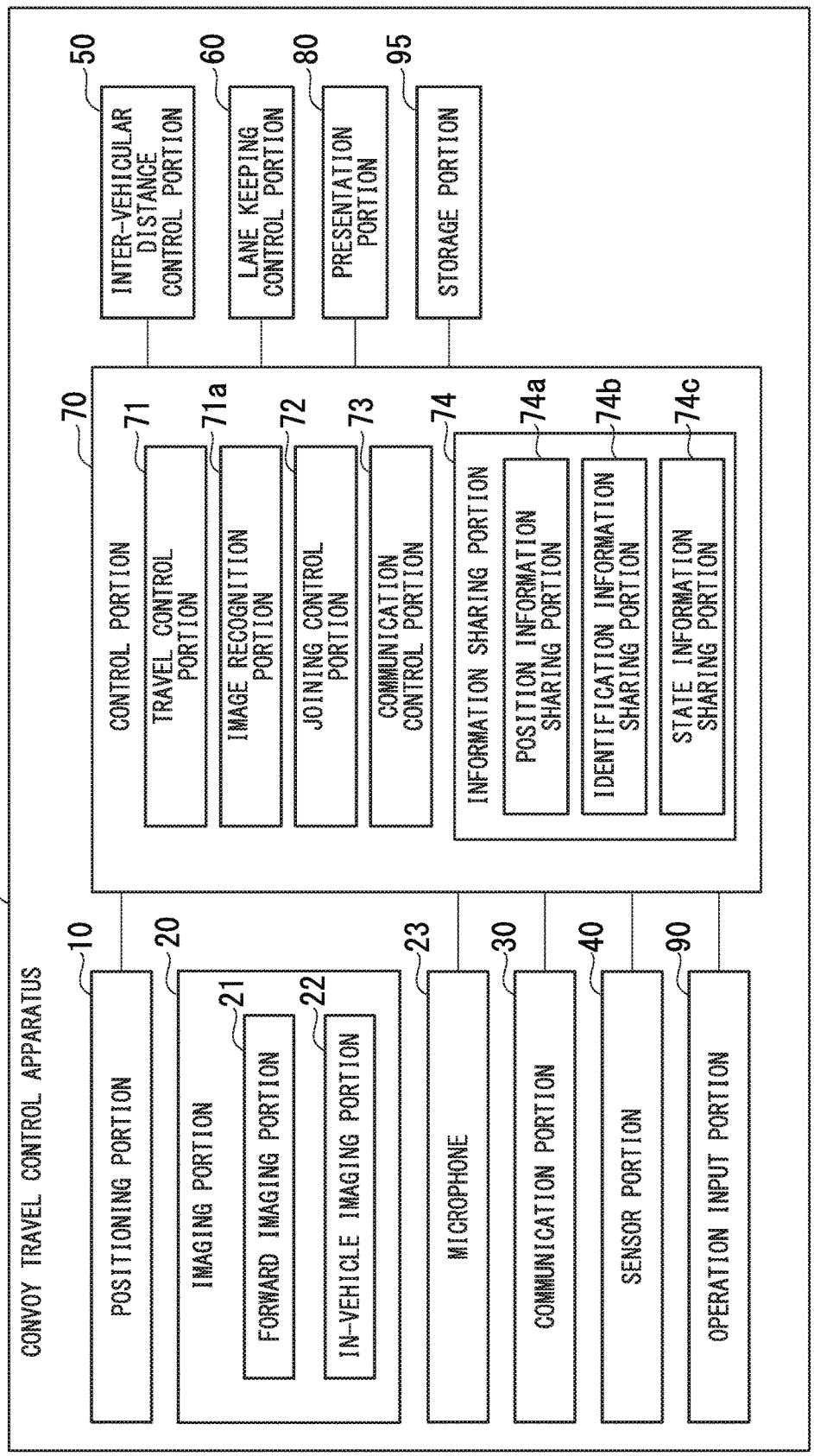
FIG. 2 is a block diagram showing an exemplary configuration of the convoy travel control apparatus, according to the first embodiment of the present invention.

FIG. 2 is a block diagram showing an exemplary configuration of the convoy travel control apparatus. The convoy travel control apparatus 100 includes: a positioning portion 10: an imaging portion 20: a microphone 23; a communication portion 30; a sensor portion 40; an inter-vehicular distance control portion 50; a lane keeping control portion 60; a control portion 70; a presentation portion 80; an operation input portion 90; and a storage portion 95.

One, two or all of the inter-vehicular distance control portion 50, the lane keeping control portion 60, and the control portion 70 are software functional portions that are functioned by, for example, a processor such as a CPU (Central Processing Unit) executing a program stored in the storage portion 95. Furthermore, one, two, or all of these functional portions may be hardware functional portions such as an LSI (Large Scale Integration) or an ASIC (Application Specific Integrated Circuit). The storage portion 95 includes: a RAM (Random Access Memory) or a ROM (Read Only Memory), a flash memory, an HDD (Hard Disk Drive), a register, or the like.

The positioning portion 10 repeatedly measures the position of its own vehicle at predetermined intervals. The positioning portion 10 measures the position of its own vehicle by, for example, receiving radio waves from satellites. The satellites are, for example, the GPS (Global Positioning System) satellites. As a result, when its own vehicle travels, the positioning portion 10 measures plural sets of coordinates that represent a trail of its own vehicle. Furthermore, the positioning portion 10 may carry out point positioning only by use of radio waves from satellites or may carry out positioning by use of the D-GPS (Differential GPS).

The imaging portion 20 has a forward imaging portion 21 and an in-vehicle imaging portion 22. The forward imaging portion 21 has an image pickup device such as a CCD (Charge Coupled Device) or a CMOS (Complementary Metal Oxide Semiconductor). The imaging portion 20 takes a motion picture image ahead of its own vehicle, generates image information, and outputs it to the control portion 70. In the motion picture image taken by the forward imaging portion 21, for example a part in which the preceding vehicle and/or the lane are imaged is included. Furthermore, in the motion picture image of the preceding vehicle that has been taken, a license plate number displayed on the rear end of the preceding vehicle may be imaged.

Similarly to the forward imaging portion 21, the in-vehicle imaging portion 22 has an image pickup device such as a CCD or a CMOS. The in-vehicle imaging portion 22 takes a motion picture image of the interior of its own vehicle, generates image information, and outputs it to the control portion 70. In the motion picture image taken by the in-vehicle imaging portion 22, for example the driver and/or passenger(s) of its own vehicle are imaged.

The microphone 23 collects a voice produced in the interior of its own vehicle, generates voice information, and outputs it to the control portion 70.

The communication portion 30 conducts wireless communication between the in-vehicle network of its own vehicle and the in-vehicle network of other communication vehicle(s) through vehicle-to-vehicle (V2V) communication. The communication portion 30 stores transmitted or received information in the storage portion 95 for data backup.

Between the communication vehicles, control-system information is transferred through vehicle-to-vehicle communication, to thereby make the vehicle-to-vehicle link of control available. The communication portion 30 conducts wireless communication with other communication vehicles based on, for example, the Wi-Fi communication standard or the 802.11 standard. Furthermore, the communication portion 30 is also capable of conducting wireless communication with other communication vehicles via a wireless station based on a predetermined cellular communication standard.

Furthermore, the communication portion 30 may conduct wireless communication with a server apparatus via a wireless station based on a predetermined cellular communication standard. The server apparatus is, for example, a cloud server apparatus. Note that the wireless communication standard on which the communication portion 30 communicates is not limited to the Wi-Fi communication standard, the 802.11 standard, or the cellular communication standard, but may be any communication standard.

The sensor portion 40 is, for example, a millimeter wave radar apparatus or a laser radar apparatus. The sensor portion 40 measures: a distance between its own vehicle and an object that is present ahead of its own vehicle; and a direction of the object with respect to its own vehicle, and then outputs a signal in accordance with the measurement result to the control portion 70.

The inter-vehicular distance control portion 50 (ACC portion: Adaptive Cruise Control portion) controls an inter-vehicular distance between its own vehicle and the preceding vehicle. To be more specific, the inter-vehicular distance control portion 50 refers to the output from the sensor portion 40, and controls the engine or the like (not shown in the figures) so that the inter-vehicular distance between its own vehicle and the preceding vehicle travelling directly in front of its own vehicle matches with a preset inter-vehicular distance (set distance).

The lane keeping control portion 60 (LKAS portion: Lane Keep Assist System) controls a steering apparatus (not shown in the figures) so that its own vehicle does not deviate from the driving lane. To be more specific, the lane keeping control portion 60 extracts characteristic points (for example, pixels whose brightness gradient is equal to a predetermined value or greater) in the image taken by the forward imaging portion 21, and furthermore, extracts linearly-aligned characteristic points. Then, the lane keeping control portion 60 recognizes a lane division line drawn or laid on the road by pattern matching processing or the like. Furthermore, based on the position of the recognized lane division line, the lane keeping control portion 60 virtually generates a path for its own vehicle not to deviate from the driving lane, and then outputs a control signal, which indicates a steering angle for travelling along the generated path, to a steering apparatus (not shown in the figures).

If the lane is not imaged in the image taken by the forward imaging portion 21, then the lane keeping control portion 60 exercises steering control so as to follow the preceding vehicle detected by the sensor portion 40, while requesting the driver to steer. Note that if the lane is not imaged in the image taken by the forward imaging portion 21, then the lane keeping control portion 60 may exercise steering control based on the position of its own vehicle that has been detected by the positioning portion 10, while requesting the driver to steer.

The control portion 70 will be described later. In accordance with the information indicative of the state in front of or behind the group of convoy vehicles, the presentation portion 80 presents at least either of the image information and the voice information. The presentation portion 80 includes, for example, a display apparatus (display device) that has a display portion, a speaker, or the like. Based on the image information, the presentation portion 80 displays an image on the display portion and outputs a voice. The image may be a motion picture image or a still image. The presentation portion 80 displays images representative of operation keys and images representative of messages.

If the control portion 70 determines that it is possible for each of the group of convoy vehicles to travel safely, the presentation portion 80 allows the driver of its own vehicle to perform operations other than driving. The condition in which it is possible for each of the group of convoy vehicles to travel safely is, for example, a condition in which, through communication between the follower vehicle and the preceding vehicle, it is possible for the follower vehicle to be driven by the inter-vehicular distance control portion 50 and the lane keeping control portion 60, to thereby follow the preceding vehicle and travel in convoy, even if follower vehicle is not driven by the driver. Note that allowable operations other than driving include, for example, an operation input via an operation key for transmitting a message to other convoy vehicles, an operation input via an operation key for starting the viewing of a motion picture image, and the like.

The operation input portion 90 is, for example, a touch-screen provided integrally with the presentation portion 80, and detects an operation input via an image of an operation key that is displayed on the presentation portion 80. The operation input portion 90 accepts the operation input, and then outputs, to control portion 70, an operation input signal in accordance with the operation input. The operation input is performed by the driver and/or passenger(s) of the communication vehicle 1. The operation input signals include, for example, one by an operation that request a termination of travelling in convoy. Note that the operation input portion 90 may include a mechanical input portion.

The storage portion 95 stores various pieces of information. The various pieces of information are, for example, information on programs executed by the processor, information transmitted or received by the communication portion 30, and point information granted to the driver according to the experience of driving a convoy vehicle. The point information is information indicative of the points granted to the driver according to the experience that satisfies predetermined conditions. The predetermined conditions are conditions for safety driving, for example, based on: the time and distance for which the driver has driven a convoy vehicle; the time and distance for which the driver has driven a leading vehicle; the number of times that the driver has merged an independent vehicle with a group of convoy vehicles; and smooth steering or braking operation. Whether the safety conditions are satisfied or not may be determined by the convoy travel control apparatus 100 that is mounted in its own vehicle or may be determined by a convoy travel control apparatus 100 that is mounted in a vehicle other than its own vehicle. Note that the point information is exchangeable to, for example, a predetermined coupon ticket (for example, a coupon ticket for vehicle inspection).

The control portion 70 has: a travel control portion 71; an image recognition portion 71a; a joining control portion 72; a communication control portion 73; and an information sharing portion 74. The information sharing portion 74 has:

a position information sharing portion 74a; an identification information sharing portion 74b; and a state information sharing portion 74c.

Figure 3:
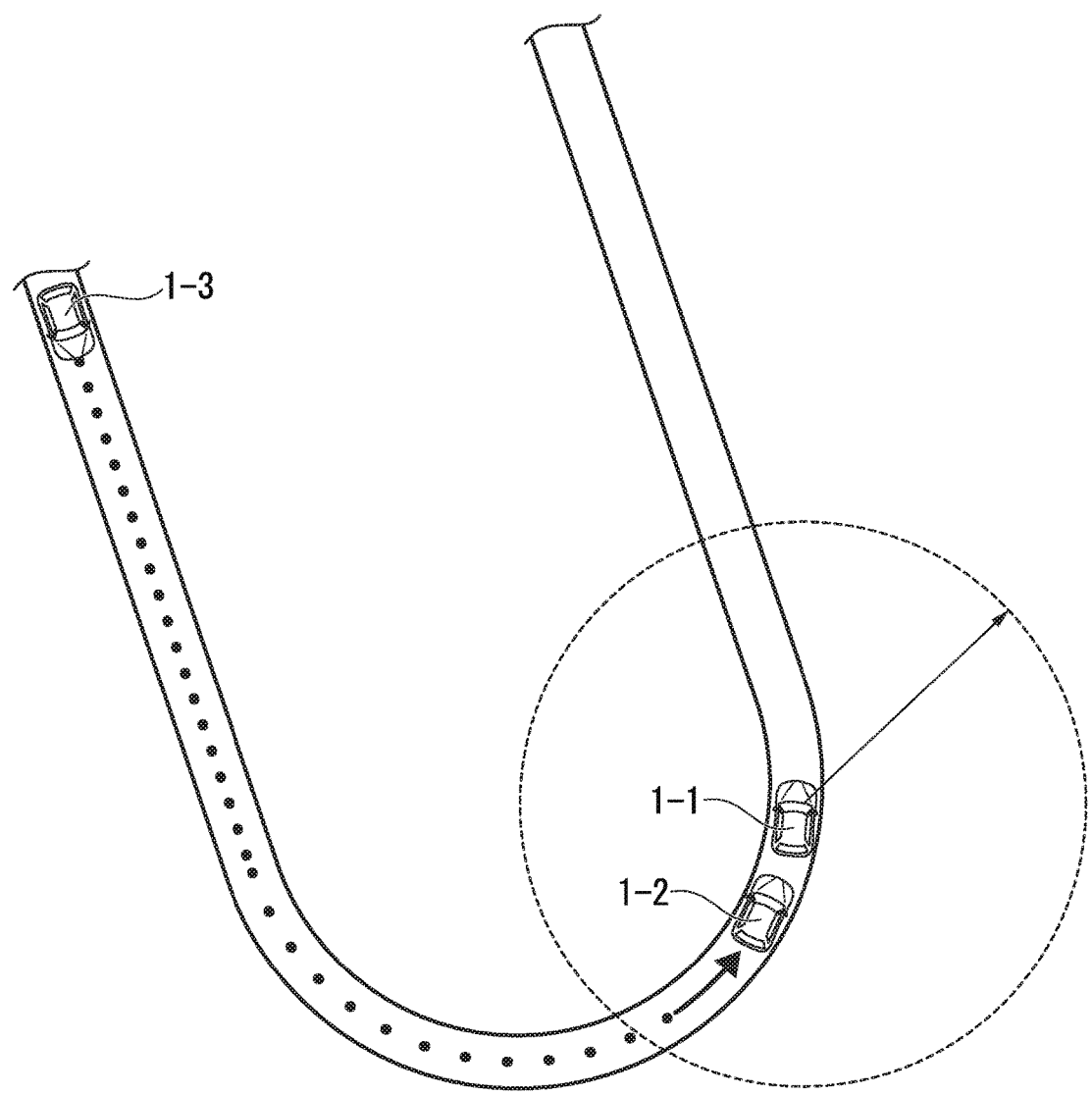
FIG. 3 is an overhead view showing an exemplary positional relationship between a group of convoy vehicles and an independent vehicle, according to the first embodiment of the present invention.

FIG. 3 is an overhead view showing an exemplary positional relationship between a group of convoy vehicles and an independent vehicle. The overhead view is displayed on the presentation portion 80. In FIG. 3, an independent vehicle is travelling behind a group of convoy vehicles that is reserved as a target of incorporation. Here, a communication vehicle 1-1 and a communication vehicle 1-2 are travelling in convoy, and are within a distance in which the vehicle-to-vehicle communication through direct wireless communication is available (in FIG. 3, a distance denoted with a broken line). On the other hand, at the time which is shown in FIG. 3, a communication vehicle 1-3 is an independent vehicle, and is at a faraway position at which the vehicle-to-vehicle communication with the communication vehicle 1-1 and the communication vehicle 1-2 through ad hoc communication is not available.

Between the communication vehicles that are spaced away from each other by not less than the distance in which ad hoc communication is available (in FIG. 3, the radius of the circle denoted with the broken line), a link of control can be obtained by control-system information being transferred via cellular communication. Note that the control-system information is stored in a server apparatus (for example, a cloud server apparatus) via a wireless base station. The server apparatus transfers control-system information to the convoy vehicles.

A convoy vehicle stores, for example, the position, course (destination), and identification number (license plate number) of its own vehicle in a server apparatus. The server apparatus transfers the position, course (destination), and identification numbers of the group of convoy vehicles to the independent vehicle. The driver of the independent vehicle is allowed to learn, via the convoy travel control apparatus 100 mounted in the vehicle, where the group of convoy vehicles is and in what state it is travelling. Namely, the driver of the independent vehicle is allowed to search for, for example, the position, course (destination), and identification numbers of the group of convoy vehicles that has been reserved as a target of incorporation, by use of the convoy travel control apparatus 100. Note that the driver of the independent vehicle may select whether he or she wants his or her own vehicle to be the leading vehicle of the group of convoy vehicles or not, and may store the selection result in the server apparatus via the convoy travel control apparatus 100.

Returning to FIG. 2, the description of the exemplary configuration of the convoy travel control apparatus 100 will be continued. The travel control portion 71 utilizes the control by the inter-vehicular distance control portion 50 and the control by the lane keeping control portion 60 to control the convoy travel of its own vehicle. The travel control portion 71 orders the lane keeping control portion 60 to follow the trail of the preceding vehicle.

Based on the information indicative of the coordinates of the rear end of the preceding vehicle that is travelling directly in front of its own vehicle, the travel control portion 71 virtually plots the coordinate points representative of the trail of the preceding vehicle, and then outputs the plotted coordinate points to the lane keeping control portion 60. Instead of generating a path based on the position of the lane division line, the lane keeping control portion 60 generates a path based on the coordinate points that have been input from the travel control portion 71, and then controls the steering apparatus so that its own vehicle travels along the path.

Figure 4:
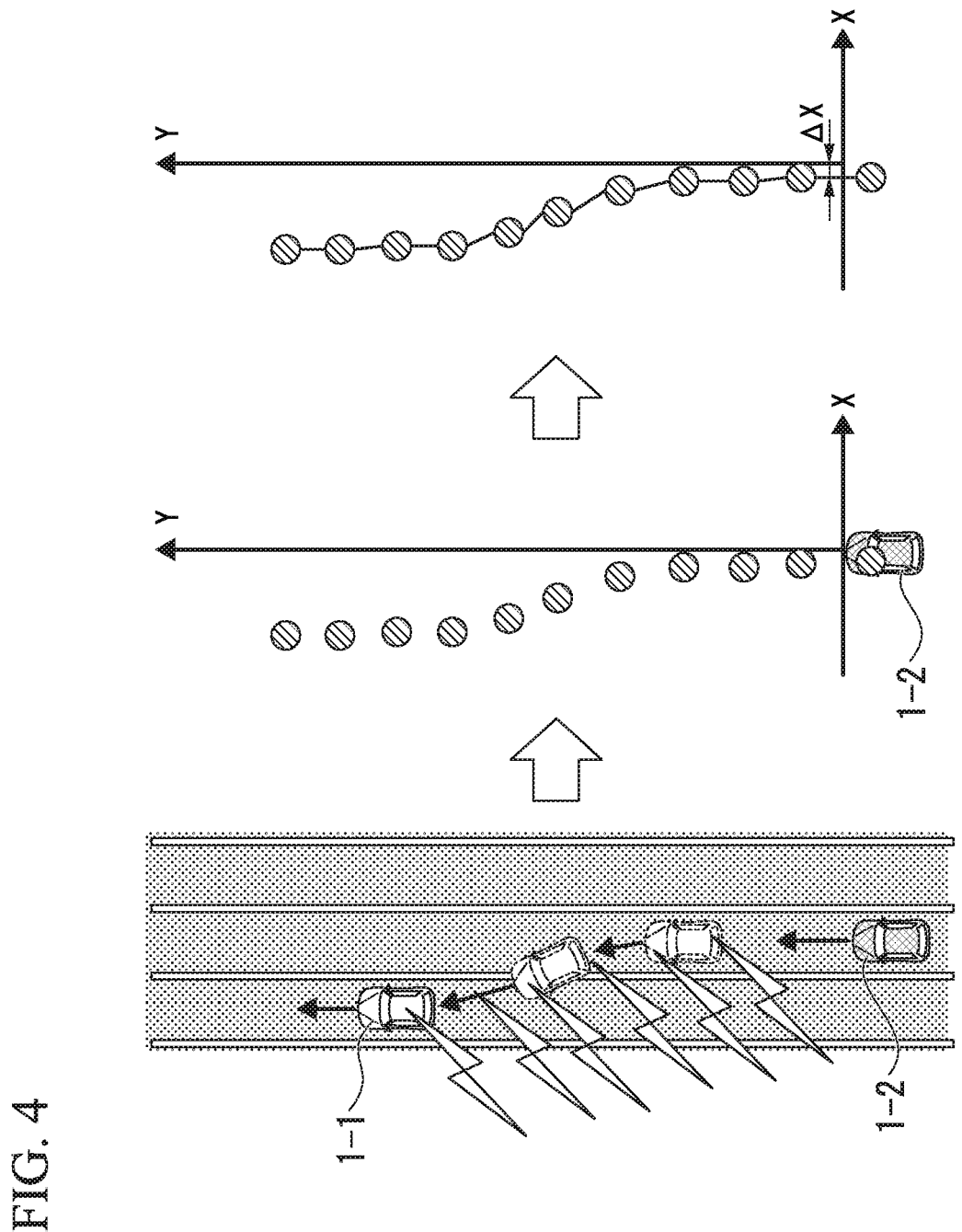
FIG. 4 is a diagram showing an exemplary method in which a follower vehicle follows a preceding vehicle as a convoy vehicle, according to the first embodiment of the present invention.

FIG. 4 is a diagram showing an exemplary method in which a follower vehicle follows a preceding vehicle as a convoy vehicle. As shown on the left side of FIG. 4, the positioning portion 10 of the communication vehicle 1-1 as a preceding vehicle repeatedly measures the position of its own vehicle at predetermined intervals. The position information sharing portion 74a of the communication vehicle 1-1 transmits plural pieces of coordinate information representative of the trail of its own vehicle, which has been positioned by the positioning portion 10, to the follower vehicle (following vehicle) 1-2.

As shown at the center of FIG. 4, based on the information indicative of the coordinates of the rear end of the communication vehicle 1-1, the lane keeping control portion 60 of the communication vehicle 1-2 virtually plots the coordinate points representative of the trail of the communication vehicle 1-1. Here, the coordinate system in which the coordinate points are virtually plotted is an XY coordinate system where the position of the communication vehicle 1-2 is the origin and where the direction of travel of the communication vehicle 1-2 is the positive direction of the Y axis.

As shown on the right side of FIG. 4, the lane keeping control portion 60 of the communication vehicle 1-2 virtually links the virtually-plotted coordinate points by use of an approximate line. The lane keeping control portion 60 traces the virtually-obtained approximate line so that the approximate line and the trail of its own vehicle (so that an error $\Delta X$ is small) overlap each other, and exercises steering control on its own vehicle. As a result, the communication vehicle 1-2 is allowed to change lanes in the same trail as that of the communication vehicle 1-1.

If the formation of convoy is completed, then the travel control portion 71 orders the inter-vehicular distance control portion 50 to perform an inter-vehicular distance control with a set distance shorter than that of the case where the formation of convoy is not completed, namely, where the inter-vehicular distance control portion 50 utilizes the output from the sensor portion 40 to perform an inter-vehicular distance control by itself. For example, in the case where its own vehicle is travelling in convoy, the travel control portion 71 causes its own vehicle to follow a convoy vehicle (preceding vehicle) at a speed of 75 km/h and at an inter-vehicular distance of 17 m. These speed and inter-vehicular distance are exemplary.

Figure 5:
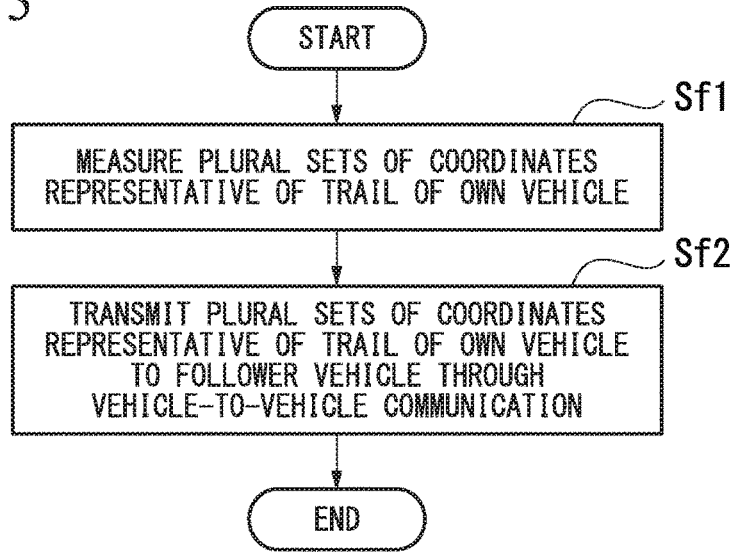
FIG. 5 is a flow chart showing an exemplary operational procedure in which a preceding vehicle as a convoy vehicle transmits coordinates representative of a trail of its own vehicle to a follower vehicle, according to the first embodiment of the present invention.

FIG. 5 is a flow chart showing an exemplary operational procedure in which a preceding vehicle as a convoy vehicle transmits the coordinates representative of the trail of its own vehicle to a follower vehicle.

(Step Sf1)

The positioning portion 10 repeatedly measures the position of its own vehicle at predetermined intervals. As a result, when its own vehicle travels, the positioning portion 10 measures plural sets of coordinates representative of the trail of its own vehicle as a preceding vehicle.

(Step Sf2)

The position information sharing portion 74a transmits plural pieces of coordinate information representative of the trail of its own vehicle to the follower vehicle (following vehicle) through vehicle-to-vehicle communication. The position information sharing portion 74a may wirelessly transmit, over broadcasting, the plural pieces of coordinate information representative of the trail of its own vehicle.

Figure 6:
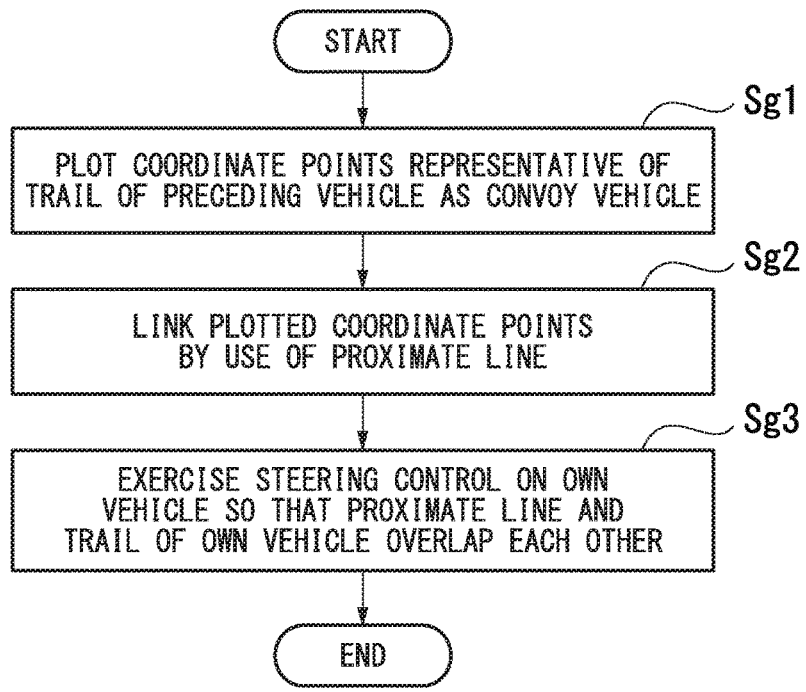
FIG. 6 is a flow chart showing an exemplary operational procedure of steering a follower vehicle, according to the first embodiment of the present invention.

FIG. 6 a flow chart showing an exemplary operational procedure of steering a follower vehicle.

(Step Sg1)

The position information sharing portion 74a receives the plural pieces of coordinate information representative of the trail of the preceding vehicle as a convoy vehicle travelling directly ahead, and stores it in the storage portion 95. The lane keeping control portion 60 virtually plots the coordinate points representative of the trail of the preceding vehicle (see FIG. 4).

(Step Sg2)

The lane keeping control portion 60 virtually links the plotted coordinate points by use of an approximate line.

(Step Sg3)

The lane keeping control portion 60 exercises steering control on its own vehicle so that the virtually-linked approximate line and the trail of its own vehicle overlap each other (so that an error $\Delta X$ is small).

Next is a description of a method of incorporating an independent vehicle into a group of convoy vehicles.

From an independent vehicle via the communication portion 30, the joining control portion 72 receives request information to incorporate the independent vehicle into the group of convoy vehicles that is travelling in convoy with its own vehicle incorporated therein. If receiving the request information to incorporate the independent vehicle into the group of convoy vehicles, then based on an operation input signal that has been output from the operation input portion 90, the joining control portion 72 determines whether to control the travel of the group of convoy vehicles or not. The operation input signal is an operation input signal indicative of whether the user has approved, through the operation on the operation input portion 90, the request information to incorporate the independent vehicle or not.

If determining that it will control the travel of the group of convoy vehicles, then the joining control portion 72 controls the travel of the group of convoy vehicles according to the positional relationship between the position of the group of convoy vehicles and the position of the independent vehicle. For example, based on the position and direction of travel of the group of convoy vehicles and on the position of the independent vehicle, the joining control portion 72 determines in which of front, rear, and side of the group of convoy vehicles the independent vehicle is positioned.

Here, the joining control portion 72 obtains coordinate information, which indicates a record of the position of the group of convoy vehicles, from the storage portion 95 at predetermined intervals. Based on the coordinate information indicative of the record of the position of the group of convoy vehicles, the joining control portion 72 calculates a trail and a direction of travel (for example, velocity vector) of the group of convoy vehicles. Furthermore, the joining control portion 72 obtains coordinate information, which indicates a record of the position of the independent vehicle, from the storage portion 95 at predetermined intervals. Based on the coordinate information indicative of the record of the position of the independent vehicle, the joining control portion 72 calculates a trail and a direction of travel of the independent vehicle.

Note that the joining control portion 72 may order the lane keeping control portion 60 to match the lane in which the group of convoy vehicles is travelling with the lane in which the independent vehicle is travelling according to the positional relationship between the position of the group of convoy vehicles and the position of the independent vehicle. Conversely to this, the independent vehicle may be controlled so as to be moved to the lane in which the group of convoy vehicles is travelling.

<Case where Independent Vehicle is Travelling Behind Group of Convoy Vehicles>

If an independent vehicle, which is not its own vehicle, is travelling behind a group of convoy vehicles, then the joining control portion 72 orders the inter-vehicular distance control portion 50 to decelerate its own vehicle incorporated in the group of convoy vehicles. Here, the joining control portion 72 requests the group of convoy vehicles to change speed, to thereby decelerate the whole of the group of convoy vehicles. Note that a lower limit is set to the speed.

If the independent vehicle is travelling behind the group of convoy vehicles, then the joining control portion 72 may generate request information to change speed to accelerate the independent vehicle. If the independent vehicle is travelling behind the group of convoy vehicles, then the joining control portion 72 may decelerate the whole of the group of convoy vehicles and may also generate request information to change speed to accelerate the independent vehicle.

Figure 7:
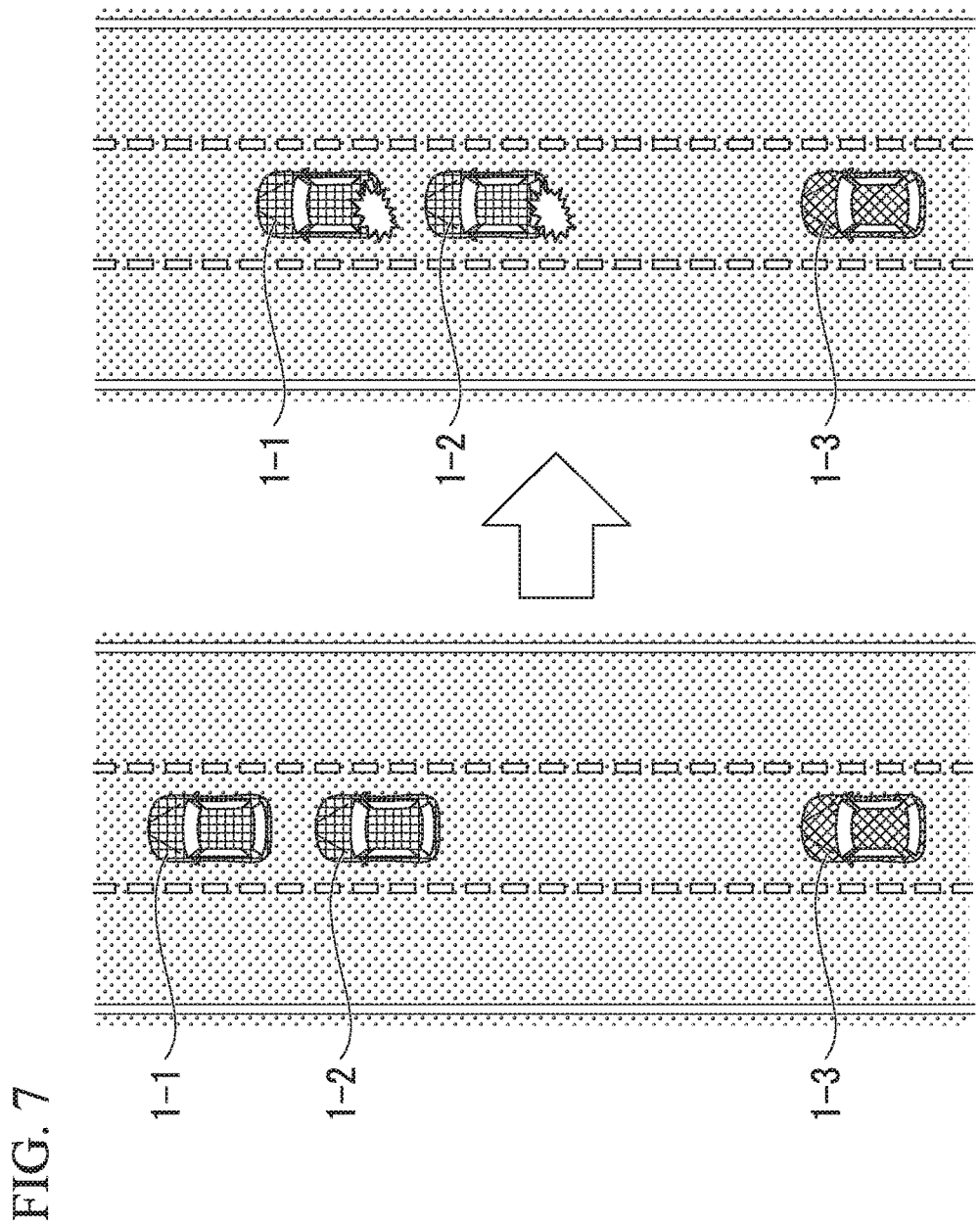
FIG. 7 is a diagram showing a method in which an independent vehicle merges with a group of convoy vehicles from behind the group of convoy vehicles, according to the first embodiment of the present invention.

FIG. 7 is a diagram showing a method in which an independent vehicle merges with a group of convoy vehicles from behind the group of convoy vehicles.

In FIG. 7, a communication vehicle 1-1 and a communication vehicle 1-2 are convoy vehicles. On the other hand, a communication vehicle 1-3 is an independent vehicle. The joining control portion 72 determines a positional relationship between a position of the group of convoy vehicles and a position of the independent vehicle based on the output(s) from at least one of the positioning portion 10 and the sensor portion 40.

For example, if the independent vehicle is positioned on the side opposite to the direction of travel of the group of convoy vehicles with respect to the group of convoy vehicles, then the joining control portion 72 determines that the independent vehicle will merge with the group of convoy vehicles from behind the group of convoy vehicles.

It is supposed that the joining control portion 72 of each of the communication vehicle 1-1 and the communication vehicle 1-2 has received request information to incorporate the independent vehicle into the group of convoy vehicles. The presentation portion 80 of each of the communication vehicle 1-1 and the communication vehicle 1-2 presents, to the driver of its own vehicle, a message of having received request information to incorporate the independent vehicle into the group of convoy vehicles. The operation input portion 90 of each of the communication vehicle 1-1 and the communication vehicle 1-2 accepts an operation input signal for selecting whether to approve the request information to incorporate the independent vehicle or not.

If to approve the request information to incorporate the independent vehicle has been selected, the joining control portion 72 of each of the communication vehicle 1-1 and the communication vehicle 1-2 orders the inter-vehicular distance control portion 50 to decelerate the group of convoy vehicles (see the right side of FIG. 7). Namely, the communication vehicle 1-1 and the communication vehicle 1-2 decelerate by themselves to allow the communication vehicle 1-3 (independent vehicle) to merge. Until the convoy is formed, the lane keeping control portion 60 of each of the communication vehicle 1-1 and the communication vehicle 1-2 keeps the lane. Furthermore, the presentation portion 80 displays an image indicating that the convoy is being formed or an image indicating that the convoy has been formed.

The joining control portion 72 determines whether an inter-vehicular distance and a difference in speed between the convoy vehicles, which have been incorporated in the group of convoy vehicles, are within predetermined ranges or not. As a result, it is possible for the joining control portion 72 to determine whether the convoy vehicles are travelling in convoy or not. Note that if an operation input signal requesting to terminate the travel in convoy has been input from the operation input portion 90, the joining control portion 72 terminates the convoy travel control for its own vehicle.

On the other hand, if its own vehicle as an independent vehicle is positioned behind the group of convoy vehicles, then the joining control portion 72 transmits, to the convoy vehicles incorporated in the group of convoy vehicles, a request information to incorporate its own vehicle into the group of convoy vehicles. The joining control portion 72 determines whether the request to incorporate its own vehicle as an independent vehicle into the group of convoy vehicles has been accepted (approved) by the group of convoy vehicles or not. The joining control portion 72 determines whether an inter-vehicular distance and a difference in speed between the tail end vehicle of the group of convoy vehicles and its own vehicle are within the predetermined ranges or not. Here, based on the inter-vehicular distance measured by the sensor portion 40, the joining control portion 72 calculates the position of the preceding vehicle.

<Case Where Independent Vehicle is Travelling in Front of Group of Convoy Vehicles>

If an independent vehicle as a vehicle other than its own vehicle is travelling in front of the group of convoy vehicles, then the joining control portion 72 orders the inter-vehicular distance control portion 50 to accelerate its own vehicle incorporated in the group of convoy vehicles. Here, the joining control portion 72 requests the group of convoy vehicles to change speed, to thereby accelerate the whole of the group of convoy vehicles. Note that an upper limit is set to the speed.

If an independent vehicle is travelling in front of the group of convoy vehicles, then the joining control portion 72 may generate request information to change speed to decelerate the independent vehicle. If an independent vehicle is travelling in front of the group of convoy vehicles, then the joining control portion 72 may generate request information to change speed to accelerate the whole of the group of convoy vehicles and also to decelerate the independent vehicle.

Figure 8:
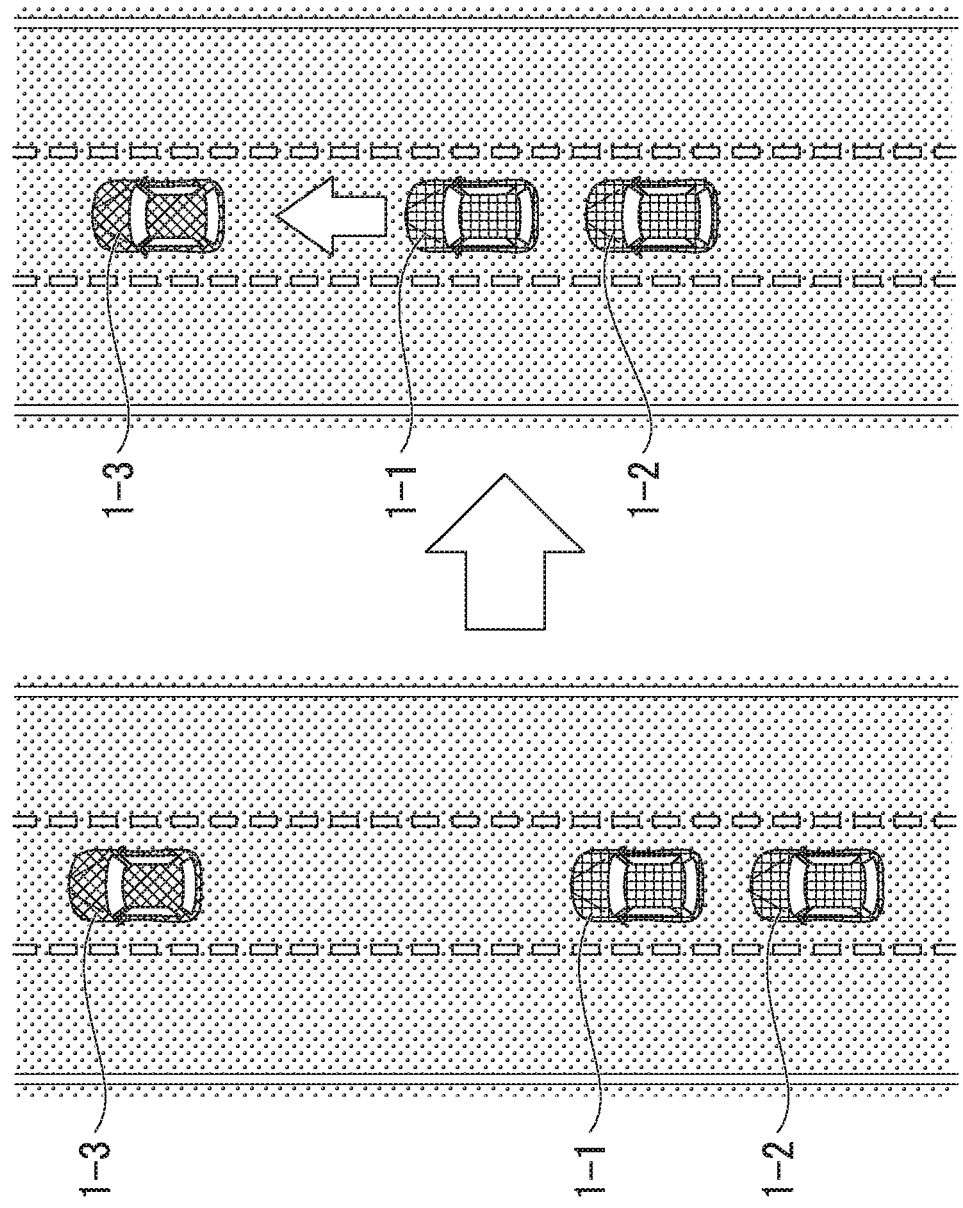
FIG. 8 is a diagram showing a method in which an independent vehicle merges with a group of convoy vehicles from front of the group of convoy vehicles, according to the first embodiment of the present invention.

FIG. 8 is a diagram showing a method in which an independent vehicle merges with a group of convoy vehicles from front of the group of convoy vehicles. In FIG. 8, a communication vehicle 1-1 and a communication vehicle 1-2 are convoy vehicles. On the other hand, a communication vehicle 1-3 is an independent vehicle. The joining control portion 72 determines a positional relationship between a position of the group of convoy vehicles and a position of the independent vehicle based on the output(s) from at least one of the positioning portion 10 and the sensor portion 40. For example, if the independent vehicle is positioned in the direction of travel of the group of convoy vehicles with respect to the group of convoy vehicles, then the joining control portion 72 determines that the independent vehicle will merge with the group of convoy vehicles from front of the group of convoy vehicles.

It is supposed that the joining control portion 72 of each of the communication vehicle 1-1 and the communication vehicle 1-2 has received request information to incorporate an independent vehicle into a group of convoy vehicles. The presentation portion 80 of each of the communication vehicle 1-1 and the communication vehicle 1-2 presents, to the driver of its own vehicle, the fact that request information to incorporate the independent vehicle into the group of convoy vehicles has been received. The operation input portion 90 of each of the communication vehicle 1-1 and the communication vehicle 1-2 accepts an operation input signal for selecting whether to approve the request information to incorporate the independent vehicle or not.

If to approve the request information to incorporate the independent vehicle has been selected, then the joining control portion 72 of each of the communication vehicle 1-1 and the communication vehicle 1-2 orders the inter-vehicular distance control portion 50 to accelerate the group of convoy vehicles (see the right side of FIG. 8). Namely, the communication vehicle 1-1 and the communication vehicle 1-2 accelerate by themselves to allow the communication vehicle 1-3 (independent vehicle) to merge. Until the convoy is formed, the lane keeping control portion 60 of each of the communication vehicle 1-1 and the communication vehicle 1-2 keep the lane. The presentation portion 80 displays an image indicating that the convoy is being formed or an image indicating that the convoy has been formed.

Subsequently, an operational procedure of incorporating an independent vehicle into a group of convoy vehicles will be described.

Figure 9:
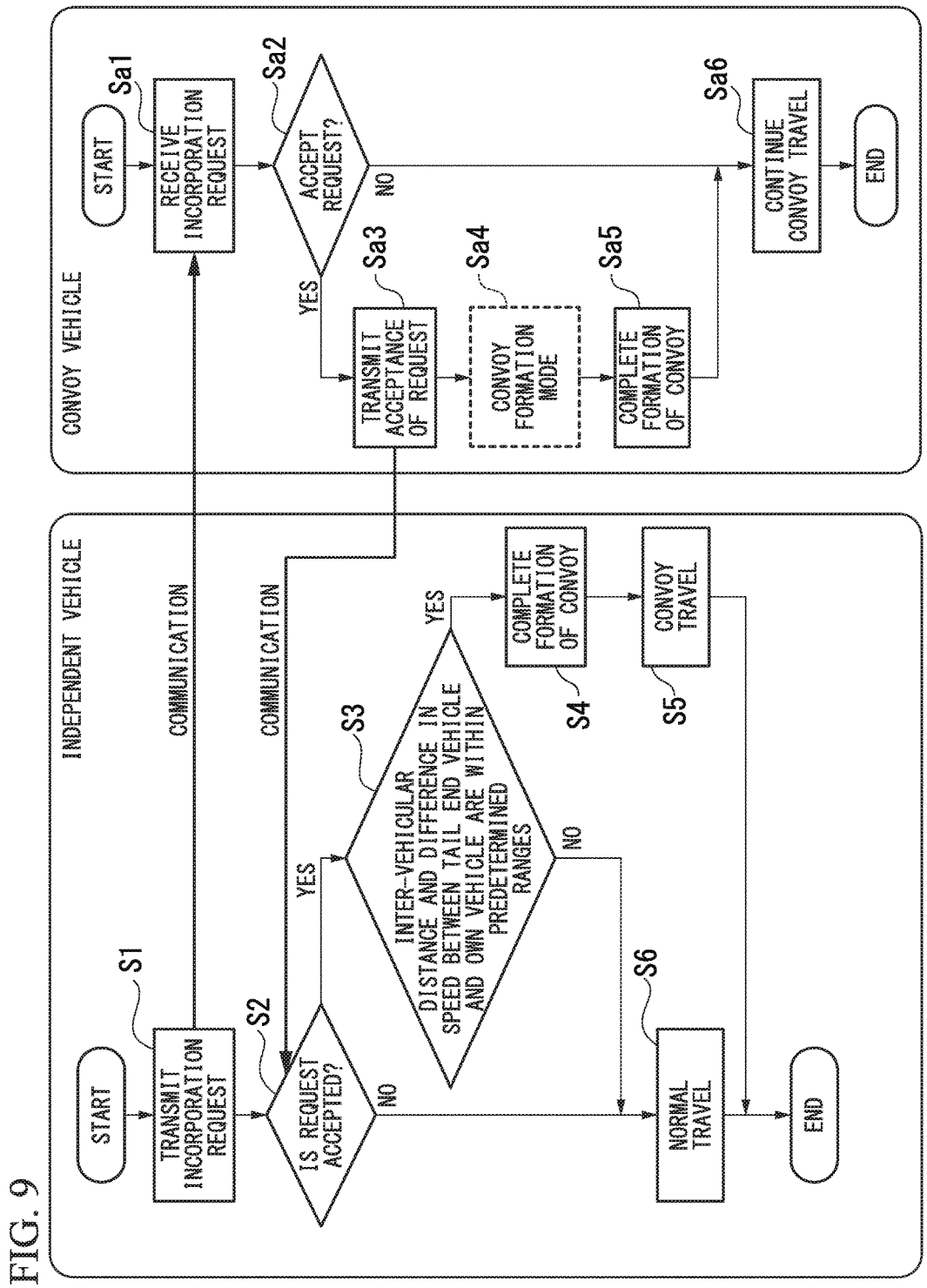
FIG. 9 is a flow chart showing an operational procedure in which an independent vehicle merges with a group of convoy vehicles from behind the group of convoy vehicles, according to the first embodiment of the present invention.

FIG. 9 is a flow chart showing an operational procedure of merging an independent vehicle into a group of convoy vehicles from behind the group of convoy vehicles. Step S1 to Step S6 form an operational procedure performed by the convoy travel control apparatus 100 mounted in the independent vehicle.

(Step S1)

The joining control portion 72 transmits a signal, which indicates request information to incorporate an independent vehicle (own vehicle) into a group of convoy vehicles, to convoy vehicles (leading vehicle, follower vehicle(s)) incorporated in the group of convoy vehicles.

(Step S2)

Based on whether or not the communication portion 30 has received a signal that has been transmitted in Step Sa3 (described later) and that is indicative of accepting the request information to incorporate the independent vehicle (own vehicle) into the group of convoy vehicles, the joining control portion 72 determines whether the request to incorporate its own vehicle into the group of convoy vehicles has been accepted by the group of convoy vehicles or not (approved or not). Whether the request to incorporate its own vehicle into the group of convoy vehicles has been accepted by the group of convoy vehicles or not is determined by whether the driver and/or passenger(s) of a convoy vehicle has performed an operation of approval or not, or has performed an operation of non-approval (or has not performed an operation of approval) or not on the operation input portion 90 provided in the convoy vehicle.

If the request to incorporate its own vehicle into the group of convoy vehicles has been accepted (Step S2: YES), then the joining control portion 72 moves the process to Step S3. On the other hand, if the request to incorporate its own vehicle into the group of convoy vehicles has not been accepted (Step S2: NO), then the joining control portion 72 moves the process to Step S6.

(Step S3)

The joining control portion 72 determines whether an inter-vehicular distance and a difference in speed between the tail end vehicle in the group of convoy vehicles and its own vehicle as the independent vehicle are within predetermined ranges or not. If the inter-vehicular distance and the difference in speed are within the predetermined ranges (Step S3: YES), the joining control portion 72 moves the process to Step S4. On the other hand, if the inter-vehicular distance or the difference in speed is not within the predetermined range (Step S3: NO), the joining control portion 72 moves the process to Step S6. Note that the joining control portion 72 may determine whether an inter-vehicular distance and a difference in speed between the leading vehicle in the group of convoy vehicles and its own vehicle as the independent vehicle are within predetermined ranges or not.
(Step S4)

Based on the control by the inter-vehicular distance control portion 50 and on the control by the lane keeping control portion 60, the joining control portion 72 merges its own vehicle as the independent vehicle with the group of convoy vehicles, to thereby complete the formation of convoy. Here, the steering for merging its own vehicle as the independent vehicle with the group of convoy vehicles is performed by the driver. The joining control portion 72 moves the process to Step S5.
(Step S5)

Based on the control by the inter-vehicular distance control portion 50 and on the control by the lane keeping control portion 60, the travel control portion 71 continues the convoy travel of its own vehicle. The joining control portion 72 terminates the convoy formation processing.
(Step S6)

The joining control portion 72 causes its own vehicle to move in predetermined normal travel instead of causing its own vehicle to travel in convoy.

On the other hand, Step Sa1 to Step Sa6 form an operational procedure that is executed by the convoy travel control apparatus 100 mounted in a convoy vehicle.
(Step Sa1)

The joining control portion 72 receives, from the independent vehicle, the signal that has been transmitted in Step S1 as described above and that is indicative of the request information to incorporate the independent vehicle into the group of convoy vehicles.
(Step Sa2)

Based on a predetermined condition, the joining control portion 72 determines whether to accept the request information to incorporate the independent vehicle into the group of convoy vehicles or not (whether to approve the request or not). If accepting the request information to incorporate the independent vehicle into the group of convoy vehicles (Step Sa2: YES), the joining control portion 72 moves the process to Step Sa3. On the other hand, if not accepting the request information to incorporate the independent vehicle into the group of convoy vehicles (Step Sa2: NO), the joining control portion 72 moves the process to Step Sa6.
(Step Sa3)

The joining control portion 72 transmits a signal, which is indicative of accepting the request information to incorporate the independent vehicle into the group of convoy vehicles, to the independent vehicle.
(Step Sa4)

The convoy travel control apparatus 100 executes an operational procedure in convoy formation mode. The operational procedure in convoy formation mode will be described later with reference to FIG. 10. The convoy travel control apparatus 100 moves the process to Step Sa5.
(Step Sa5)

Based on the control by the inter-vehicular distance control portion 50 and on the control by the lane keeping control portion 60, the travel control portion 71 causes its own vehicle to travel in convoy. The travel control portion 71 moves the process to Step Sa6.
(Step Sa6)

The travel control portion 71 continues the convoy travel of its own vehicle.

Figure 10:
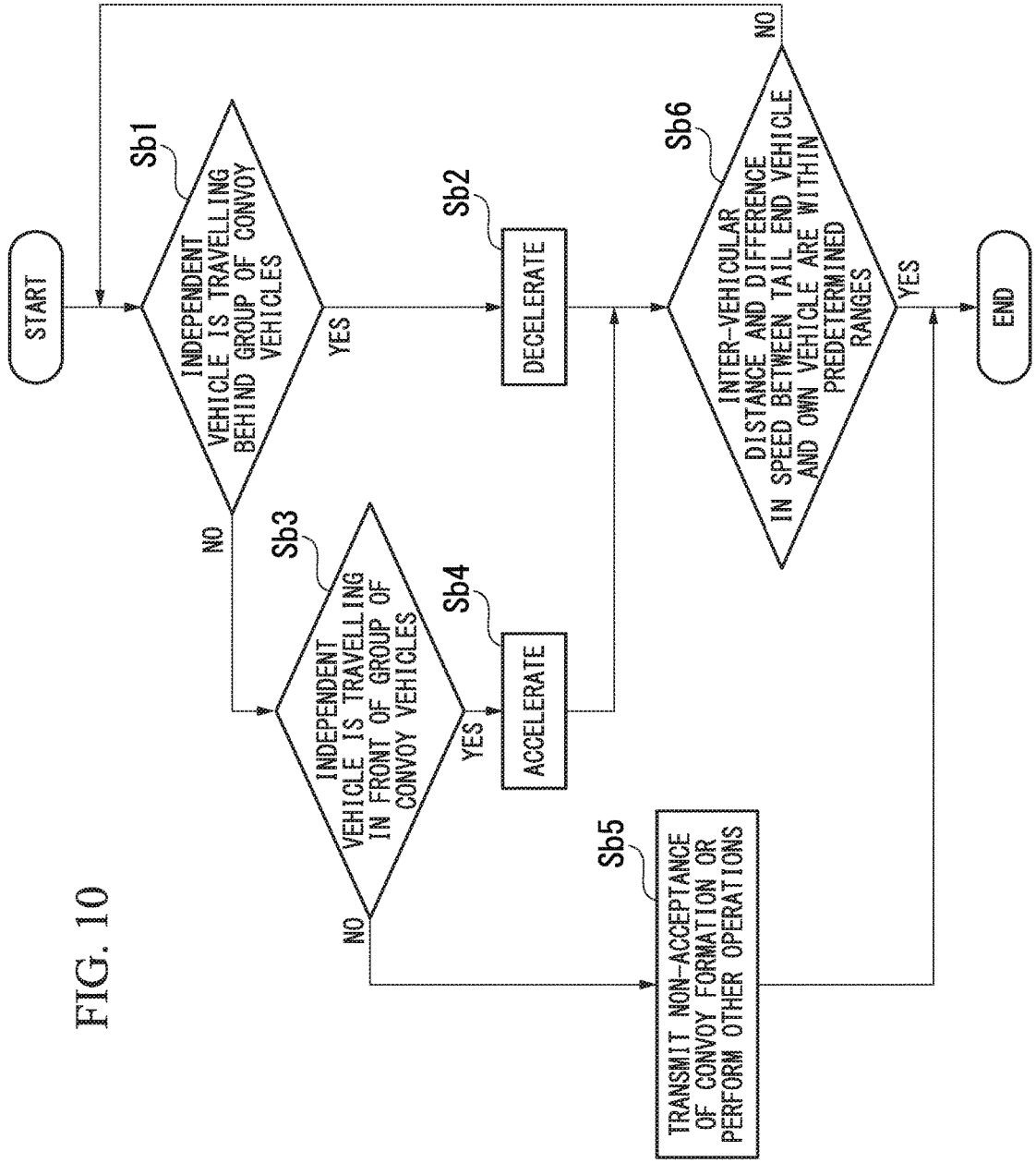
FIG. 10 is a flow chart showing an operational procedure in convoy formation mode in which an independent vehicle merges with a group of convoy vehicles from front of or behind the group of convoy vehicles, according to the first embodiment of the present invention.

FIG. 10 is a flow chart showing an operational procedure in convoy formation mode for merging an independent vehicle with a group of convoy vehicles from front or behind the group of convoy vehicles. Step Sb1 to Step Sb6 form an operational procedure executed by the convoy travel control apparatus 100 mounted in a convoy vehicle.
(Step Sb1)

The joining control portion 72 determines a positional relationship between a position of the group of convoy vehicles and a position of the independent vehicle. To be more specific, the joining control portion 72 determines whether the independent vehicle is travelling behind the group of convoy vehicles or not. If the independent vehicle is travelling behind the group of convoy vehicles (Step Sb1: YES), then the joining control portion 72 moves the process to Step Sb2. On the other hand, if the independent vehicle is not travelling behind the group of convoy vehicles (Step Sb1: NO), then the joining control portion 72 moves the process to Step Sb3. Note that, instead of moving the process to Step Sb3, the joining control portion 72 may move the process to Step Sb4.
(Step Sb2)

The joining control portion 72 decelerates the group of convoy vehicles. The joining control portion 72 moves the process to Step Sb6.
(Step Sb3)

The joining control portion 72 determines whether the independent vehicle is travelling in front of the group of convoy vehicles or not. If the independent vehicle is travelling in front of the group of convoy vehicles (Step Sb3: YES), then the joining control portion 72 moves the process to Step Sb4. On the other hand, if the independent vehicle is not travelling in front of the group of convoy vehicles (Step Sb3: NO), then the joining control portion 72 moves the process to Step Sb5.
(Step Sb4)

The joining control portion 72 accelerates the group of convoy vehicles. The joining control portion 72 moves the process to Step Sb6.
(Step Sb5)

The joining control portion 72 transmits a signal, which indicates not accepting the request information to incorporate the independent vehicle into the group of convoy vehicles (formation of convoy not allowed), to the independent vehicle. Note that the joining control portion 72 orders the lane keeping control portion 60 to match the lane in which the group of convoy vehicles is travelling with the lane in which the independent vehicle is travelling.
(Step Sb6)

The joining control portion 72 determines whether an inter-vehicular distance and a difference in speed between the tail end vehicle of the group of convoy vehicles and the independent vehicle are within predetermined ranges or not. If the inter-vehicular distance and the difference in speed between the tail end vehicle of the group of convoy vehicles and the independent vehicle are within the predetermined ranges (Step Sb6: YES), then the joining control portion 72 determines that a formation of convoy has been completed, and terminates the processing in convoy formation mode. On the other hand, if the inter-vehicular distance or the difference in speed between the tail end vehicle of the group of convoy vehicles and the independent vehicle is not within the predetermined range, then (Step Sb6: NO), then the joining control portion 72 returns the process to Step Sb1. Note that the joining control portion 72 may determine whether an inter-vehicular distance and a difference in speed between the leading vehicle of the group of convoy vehicles and the independent vehicle are within predetermined ranges or not.

<Recognition of Whether Vehicle is in Convoy or Not>

If the identification number (license plate number) allocated to the imaged preceding vehicle matches with the identification number allocated to a convoy vehicle, then the joining control portion 72 determines that the imaged preceding vehicle is a convoy vehicle included in the group of convoy vehicles.

Figure 11:
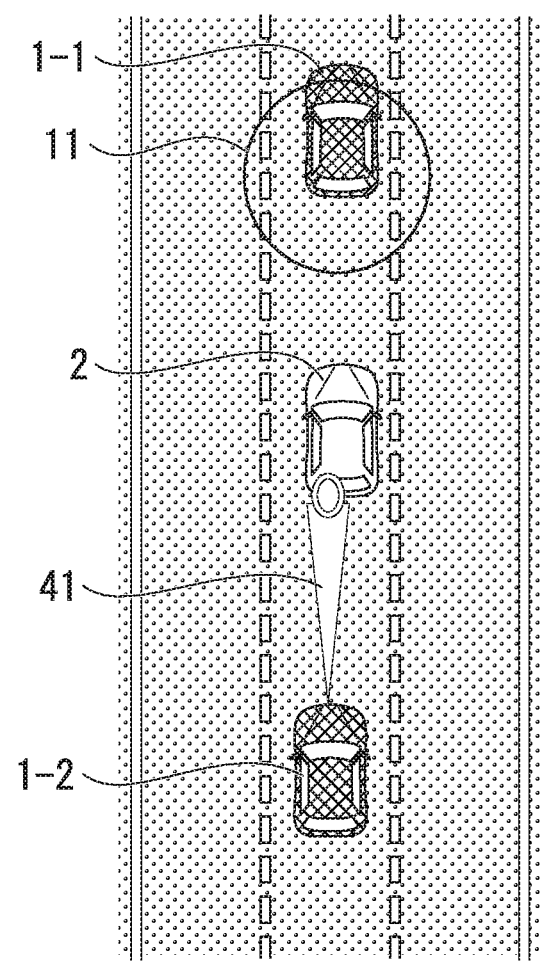
FIG. 11 is a diagram showing a situation in which an independent vehicle determines that a preceding vehicle directly ahead is a non-communication vehicle, according to the first embodiment of the present invention.

FIG. 11 is a diagram showing a situation in which an independent vehicle determines that the preceding vehicle directly ahead is a non-communication vehicle. In FIG. 11, it is supposed that, between a communication vehicle 1-1 (for example, a convoy vehicle) and a communication vehicle 1-2 (for example, an independent vehicle), a non-communication vehicle 2 is travelling. The position information sharing portion 74a of the communication vehicle 1-2 receives information indicative of a position of the communication vehicle 1-1 through vehicle-to-vehicle communication. In FIG. 11, it is supposed that the information indicative of the position of the communication vehicle 1-1 indicates a positional range 11 at a rear end of the communication vehicle 1-1.

The sensor portion 40 irradiates a beam 41 in a forward direction of its own vehicle, to thereby measure an inter-vehicular distance to the preceding vehicle directly ahead. Based on the inter-vehicular distance measured by the sensor portion 40 and on the position of its own vehicle, the joining control portion 72 calculates a position of the preceding vehicle (non-communication vehicle 2) directly ahead. Because the calculated position of the preceding vehicle is not included in the positional range 11, the joining control portion 72 determines that the preceding vehicle is a non-communication vehicle. Note that if the preceding vehicle is a non-communication vehicle, the travel control portion 71 orders the inter-vehicular distance control portion 50 to control the inter-vehicular distance with the set distance longer than that of the case where the preceding vehicle is a communication vehicle.

Figure 12:
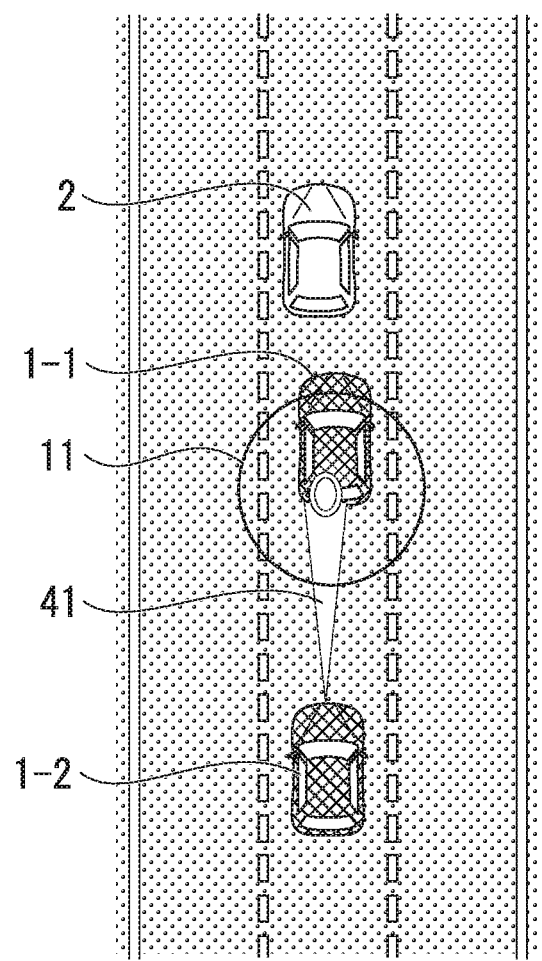
FIG. 12 is a diagram showing a situation in which an independent vehicle determines that a preceding vehicle directly ahead is a communication vehicle, according to the first embodiment of the present invention.

FIG. 12 is a diagram showing a situation in which an independent vehicle determines that a preceding vehicle directly ahead is a communication vehicle. In FIG. 12, it is supposed that, between a non-communication vehicle 2 and a communication vehicle 1-2 (for example, independent vehicle), a communication vehicle 1-1 (for example, a convoy vehicle) is travelling. The position information sharing portion 74a of the communication vehicle 1-2 receives information indicative of a position of the communication vehicle 1-1 through vehicle-to-vehicle communication. In FIG. 12, it is supposed that the information indicative of the position of the communication vehicle 1-1 indicates a positional range 11 at a rear end of the communication vehicle 1-1.

<Determination Based on Inter-Vehicular Distance>

The sensor portion 40 irradiates a beam 41 in a forward direction of its own vehicle, to thereby measure an inter-vehicular distance to the preceding vehicle directly ahead. Based on the inter-vehicular distance measured by the sensor portion 40 and on a position of its own vehicle, the joining control portion 72 calculates a position of the preceding vehicle (communication vehicle 1-1) directly ahead. If the calculated position of the preceding vehicle is included in the positional range 11, then the joining control portion 72 determines that the preceding vehicle is a communication vehicle.

<Determination Based on Taken Image>

The image recognition portion 71a recognizes a state around its own vehicle through image processing. For example, the image recognition portion 71a recognizes, through image processing, an identification number (license plate number) allocated to the preceding vehicle whose image has been taken by the forward imaging portion 21.

The identification information sharing portion 74b of the communication vehicle 1-1 transmits the identification number (license plate number) allocated to its own vehicle to the identification information sharing portion 74b of the communication vehicle 1-2. The image recognition portion 71a recognizes, through image processing, the identification number (license plate number) allocated to the communication vehicle 1-1 whose image has been taken by the forward imaging portion 21. If the identification number allocated to the imaged preceding vehicle matches with the identification number allocated to a convoy vehicle, then the joining control portion 72 determines that the imaged preceding vehicle is a convoy vehicle included in the group of convoy vehicles.

Furthermore, the inter-vehicular distance control portion 50 of the communication vehicle 1-1 as a preceding vehicle decelerates its own vehicle to approach the communication vehicle 1-2 as a following vehicle until the inter-vehicular distance is short enough to allow the forward imaging portion 21 of the communication vehicle 1-2 to take an image of the communication vehicle 1-1. As a result, the forward imaging portion 21 of the communication vehicle 1-2 as a following vehicle is in a state of being capable of taking an image of a light source portion (a brake light, a tail lamp, or the like) that is provided on the rear end of the communication vehicle 1-1 as a preceding vehicle.

In this condition, the identification information sharing portion 74b of the communication vehicle 1-1 transmits lighting timing information of the light source portion provided on the rear end of its own vehicle to the communication vehicle 1-2. The travel control portion 71 of the communication vehicle 1-2 determines whether or not the timing indicated by the received lighting timing information matches with the timing at which the light source portion imaged by the forward imaging portion 21 lights up. If the timing indicated by the lighting timing information matches with the timing at which the light source portion imaged by the forward imaging portion 21 lights up, then the travel control portion 71 of the communication vehicle 1-2 determines that the imaged preceding vehicle is a communication vehicle.

Figure 13:
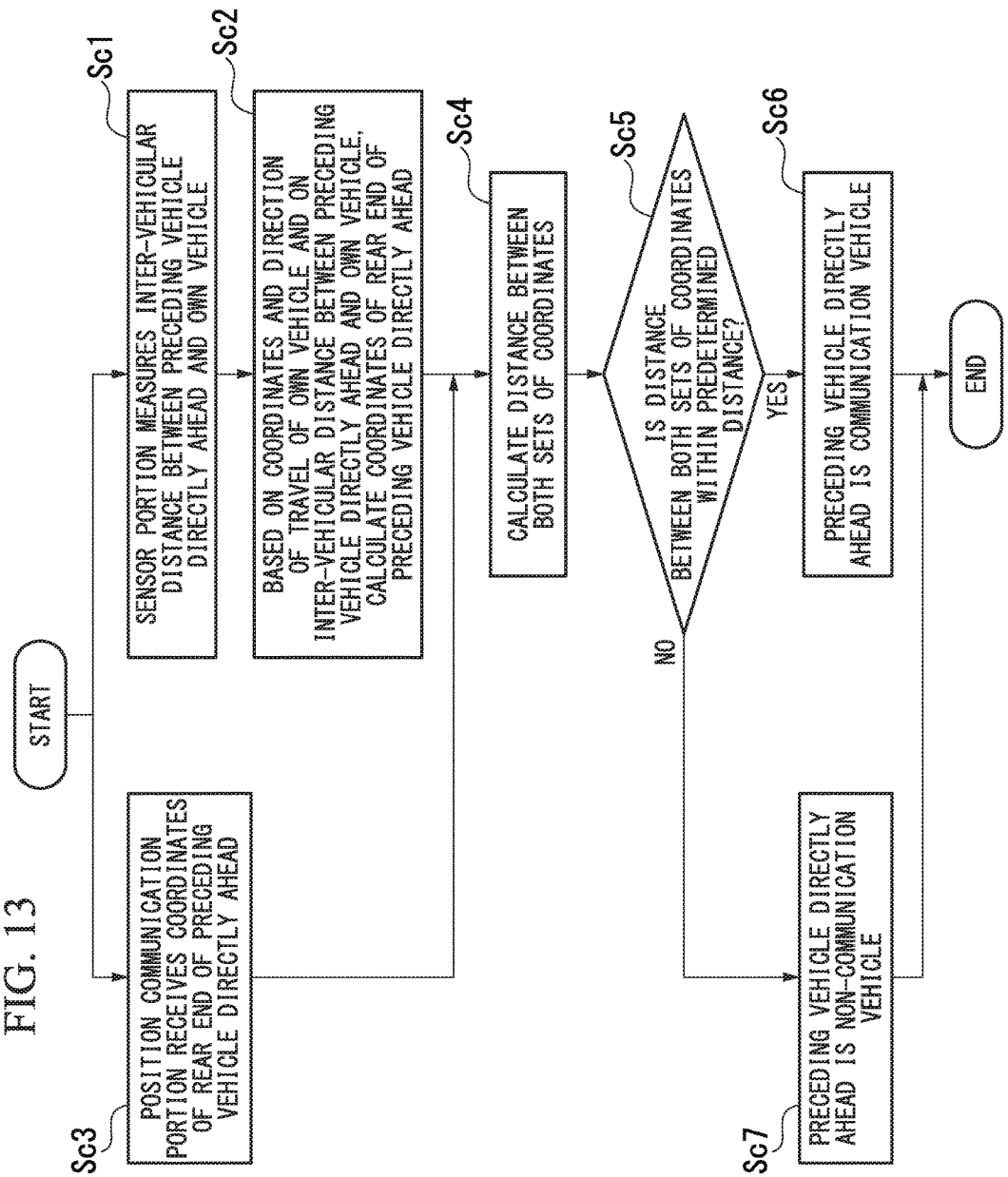
FIG. 13 is a flow chart showing an exemplary operational procedure in which an independent vehicle determines whether a preceding vehicle directly ahead is a communication vehicle or not, according to the first embodiment of the present invention.

FIG. 13 is a flow chart showing an exemplary operational procedure in which an independent vehicle determines whether a preceding vehicle directly ahead is a communication vehicle or not.

(Step Sc1)

The sensor portion 40 measures an inter-vehicular distance between the preceding vehicle directly ahead and its own vehicle. The travel control portion 71 moves the process to Step Sc2.

(Step Sc2)

Based on the inter-vehicular distance measured by the sensor portion 40, the travel control portion 71 calculates the coordinates of the rear end of the preceding vehicle directly ahead, and moves the process to Step Sc4.

(Step Sc3)

The position information sharing portion 74a receives information indicative of the coordinates of the rear end of the preceding vehicle directly ahead, and moves the process to Step Sc4.

(Step Sc4)

The travel control portion 71 calculates a distance between the coordinates of the rear end of the preceding vehicle directly ahead, which are based on the inter-vehicular distance measured by the sensor portion 40, and the coordinates of the rear end of the preceding vehicle directly ahead, which have been received by the position information sharing portion 74a. The travel control portion 71 moves the process to Step Sc5.

(Step Sc5)

The travel control portion 71 determines whether the distance between the coordinates of the rear end of the preceding vehicle directly ahead, which are based on the inter-vehicular distance measured by the sensor portion 40, and the coordinates of the rear end of the preceding vehicle directly ahead, which have been received by the position information sharing portion 74a, is within a predetermined range or not. If the distance between both sets of coordinates is within the predetermined range (Step Sc5: YES), then the travel control portion 71 moves the progress to Step Sc6. On the other hand, if the distance between both sets of coordinates is not within the predetermined range (Step Sc5: NO), then the travel control portion 71 moves the process to Step Sc7.

(Step Sc6)

The travel control portion 71 determines that the preceding vehicle directly ahead is a communication vehicle, and terminates the operational procedure.

(Step Sc7)

The travel control portion 71 determines that the preceding vehicle directly ahead is not a communication vehicle, namely, that the preceding vehicle directly ahead is a non-communication vehicle, and terminates the operational procedure.

Next, a communication tool between convoy vehicles will be described.

The communication control portion 73 receives image information and voice, in which the interior of a convoy vehicle incorporated in a group of convoy vehicles is taken, from the convoy vehicle. The communication control portion 73 transmits the image information and voice information, in which the interior of its own vehicle is taken, to the convoy vehicle. The image communication conducted by the communication control portion 73 is, for example, communication based on the Wi-Fi standard. Furthermore, the communication control portion 73 may receive and transmit image information indicative of a message. Note that the communication carried out by the communication control portion 73 is not limited to the Wi-Fi standard, but may be based on any communication standard.

Figure 14:
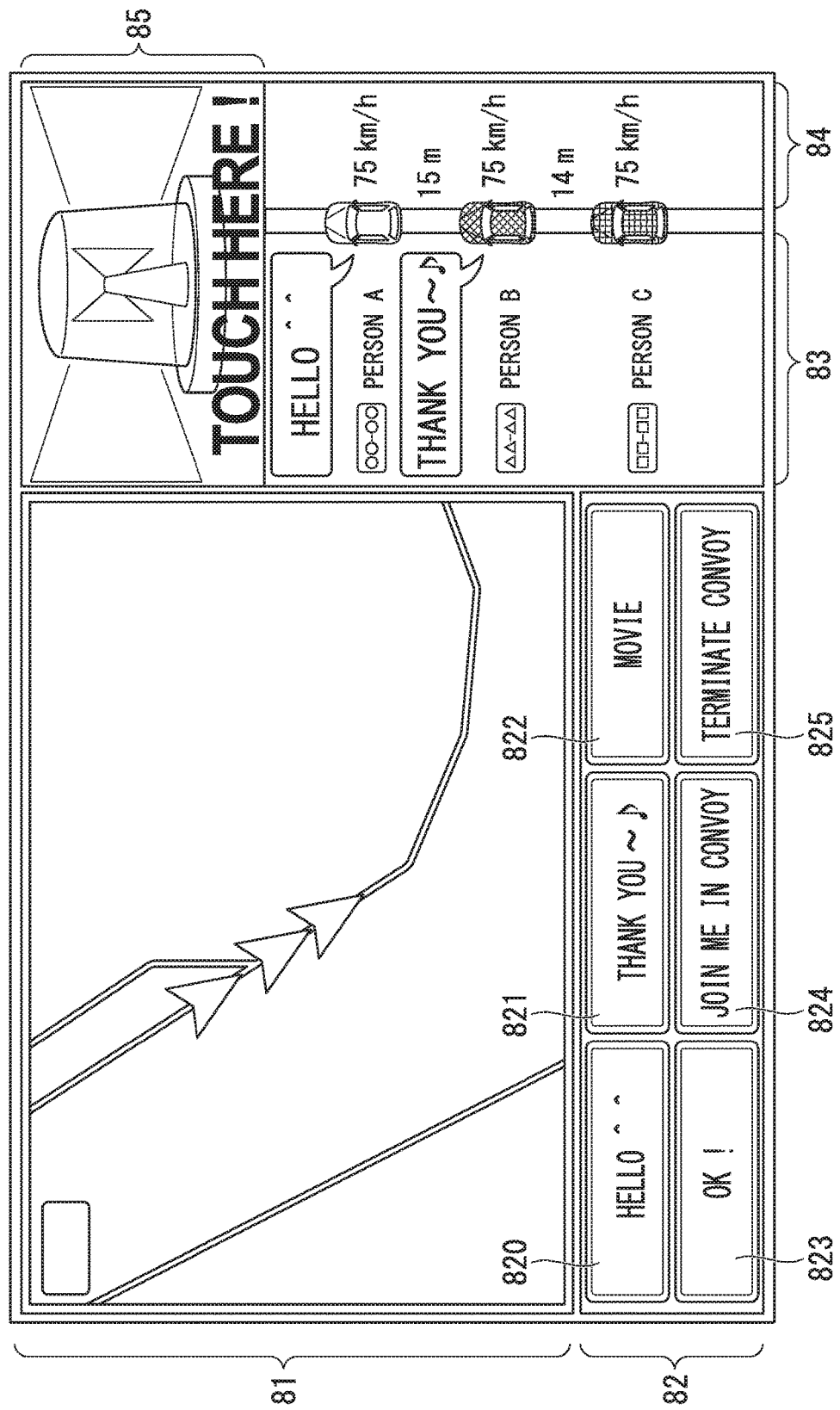
FIG. 14 is a diagram showing a first example of human interface image, according to the first embodiment of the present invention.

FIG. 14 is a diagram showing a first example of human interface image. Hereinafter, the description will be continued on the supposition that the presentation portion 80 is, by way of example, a display apparatus with the operation input portion 90. The presentation portion 80 displays a human interface image as a communication tool among the drivers and passengers on the communication vehicles.

Based on a predetermined condition, the communication control portion 73 determines whether each in the group of convoy vehicles is capable of travelling safely or not. If, for example, a condition is satisfied that no other vehicles are present around the group of convoy vehicles and also that the road shape ahead of the group of convoy vehicles is straight, then the communication control portion 73 determines that the group of convoy vehicles is capable of travelling safely. Note that this predetermined condition is exemplary.

If its own vehicle is incorporated in the group of convoy vehicles as a follower vehicle, then the travel control portion 71 causes its own vehicle to travel in convoy even though the driver does not drive the own vehicle. Therefore, the presentation portion 80 allows the driver of its own vehicle to perform operations other than driving. Note that the human interface image is displayed on the presentation portion 80 irrespective of whether its own vehicle is incorporated in the group of convoy vehicles or not.

In the human interface image as a communication tool, there are established: a main image display area 81; an operation key display area 82; a message display area 83; a travel information display area 84; and an information display area 85.

In the main image display area 81, an image in which the position of the group of convoy vehicles is shown on a map is displayed, by way of example.

In the operation key display area 82, there are depressably displayed: a first operation key 820; a second operation key 821; a third operation key 822; a fourth operation key 823; a fifth operation key 824; and a sixth operation key 825.

In the first operation key 820, there is displayed "Hello (graphic diagram)" as a string of characters and the like indicative of a message. In the second operation key 821, there is displayed "Thank you (graphic diagram)" as a string of characters and the like indicative of a message In the third operation key 822, there is displayed "MOVIE" as a string of characters indicative of an operation input that causes the communication control portion 73 to receive and transmit image information. In the fourth operation key 823, there is displayed "OK (graphic diagram)" as a string of characters and the like indicative of a message. The fourth operation key 823 is operated by the driver when, for example, approving request information to incorporate an independent vehicle into a group of convoy vehicles.

In the fifth operation key 824, there is displayed "Join me in convoy" as a string of characters indicative of request information to incorporate its own vehicle into a group of convoy vehicles. If the fifth operation key 824 is operated, then the joining control portion 72 transmits the request information to incorporate its own vehicle into a group of convoy vehicles, to the group of convoy vehicles. In the sixth operation key 825, there is displayed "Terminate convoy" a string of characters indicative of an operation input for terminating the travel in convoy (for becoming an independent vehicle). Note that if its own vehicle is not travelling in convoy, the sixth operation key 825 may not be displayed.

In the message display area 83, there are displayed: string(s) of characters and the like indicative of message(s) that have been transmitted from other communication vehicle(s) and received by the communication control portion 73; identification number(s) (license plate number(s)) received by the identification information sharing portion 74b; the name(s) of the driver(s); and so on. For example, a string of characters and the like "Hello (graphical diagram)" displayed in the message display area 83 is a message that has been operationally input via a first operation key 820 in another communication vehicle.

In the travel information display area 84, there are displayed speeds of and inter-vehicular distances between the communication vehicles 1, by way of example of travel information.

In the information display area 85, there is displayed state information that has been transmitted from another communication vehicle and received by the state information sharing portion 74c. With reference to the state information, the driver is capable of learning the state in front of or behind the group of convoy vehicles. For example, in the message display area 83, there is displayed a string of characters and the like "Touch here!" together with a graphic diagram. With a depressing operation on the message display area 83, the driver causes what is indicated by the state information to be displayed. As a result, the driver is capable of learning that there is an obstacle ahead.

Figure 15:
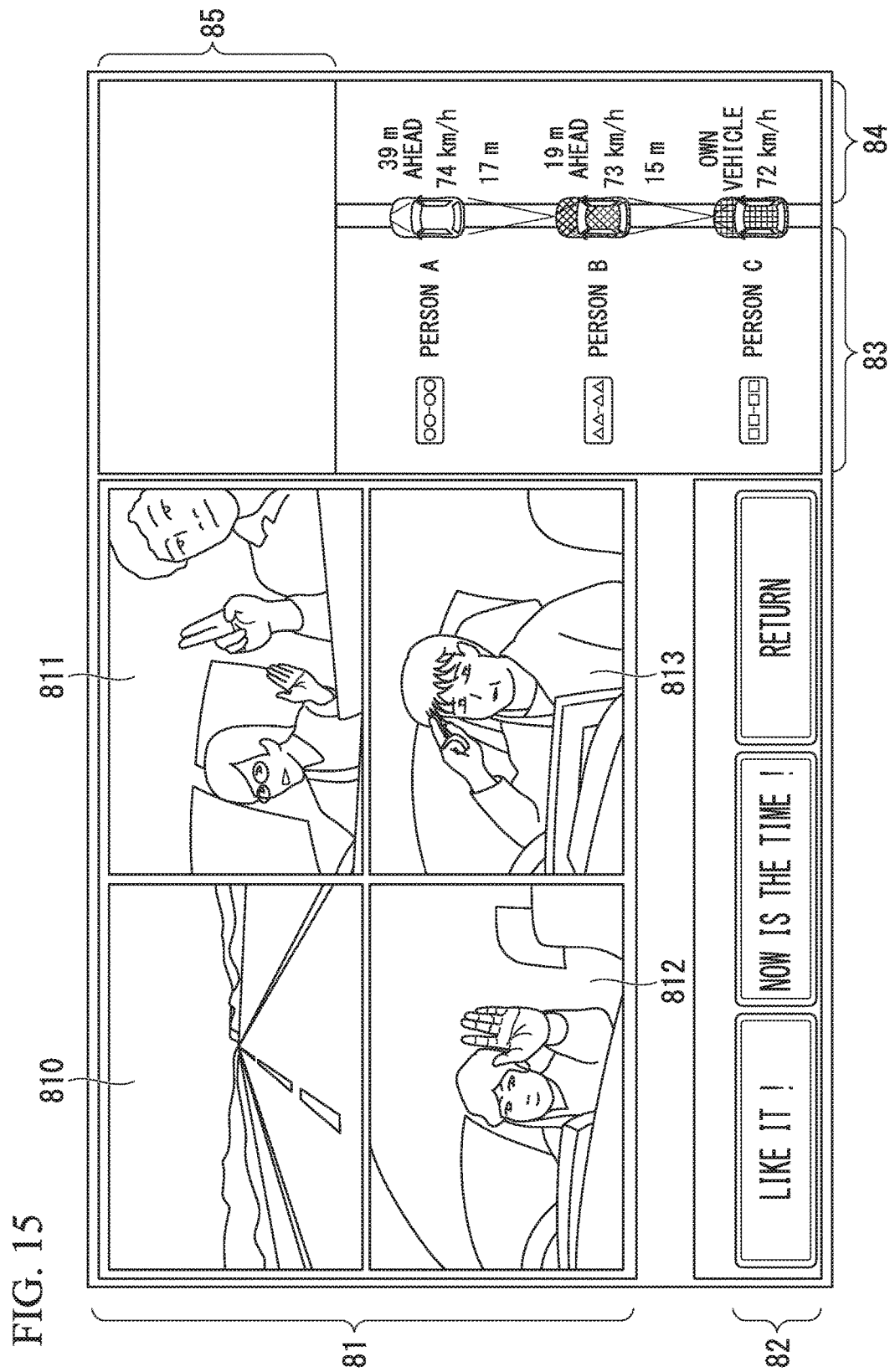
FIG. 15 is a diagram showing an example of how to display videos of interiors of convoy vehicles, according to the first embodiment of the present invention.

FIG. 15 is a diagram showing an example of how to display videos of the interiors of convoy vehicles. In FIG. 15, in the main image display area 81, there are established: a forward video display area 810; a first interior video display area 811; a second interior video display area 812; and a third interior video display area 813.

In the forward video display area 810, a realtime motion picture image in which a forward view from the leading vehicle is imaged is displayed based on the image information that has been transmitted from the leading vehicle incorporated in the same group of convoy vehicles as that of its own vehicle. With the third operation key 822 being operated in the leading vehicle and the own vehicle, the realtime motion picture image in which the forward view from the leading vehicle is imaged is displayed in the forward video display area 810.

In the first interior video display area 811, a realtime motion picture image in which the interior of the leading vehicle is imaged is displayed based on the image information that has been transmitted from the leading vehicle incorporated in the same group of convoy vehicles as that of its own vehicle. In the second interior video display area 812, a realtime motion picture image in which the interior of another follower vehicle is imaged is displayed based on the image information that has been transmitted from the follower vehicle incorporated in the same group of convoy vehicles as that of its own vehicle. In the third interior video display area 813, a realtime motion picture image in which the interior of its own vehicle is displayed based on the image information that has been output from the in-vehicle imaging portion 22 of its own vehicle. The image information that has been output from the forward imaging portion 21 of its own vehicle is wirelessly transmitted to other convoy vehicles over vehicle-to-vehicle communication via the communication control portion 73. Based on the voice information, the presentation portion 80 outputs a voice in synchronization with the motion picture image. Note that, in the operation key display area 82, operation keys for transmitting various pieces of information to other convoy vehicles are displayed.

The inter-vehicular distance between the convoy vehicles incorporated in a group of convoy vehicles is set to be shorter than that of the case where the vehicles are not travelling in convoy. Therefore, it is possible to share the image information and voice information in stable, high communication quality. The driver is informed of the events in front of the leading vehicle, which cannot be seen directly from his or her own vehicle, from the group of preceding vehicles including the leading vehicle, through vehicle-to-vehicle communication. This allows the driver to drive the vehicle in relief. Furthermore, the driver is capable of having conversation with drivers of other convoy vehicles, and watching their faces. Therefore, it is possible to realize joy and a feeling of unity in the group of convoy vehicles.

Next, information sharing among convoy vehicles will be described.

The position information sharing portion 74a receives position information, via the communication portion 30, from each convoy vehicle incorporated in a group of convoy vehicles, to thereby receive information indicative of a position of the group of convoy vehicles. For example, the position information sharing portion 74a receives information, which indicates the coordinates of the rear end of a preceding vehicle that is travelling directly in front of its own vehicle, from the preceding vehicle. The position information sharing portion 74a receives information indicative of a position of an independent vehicle that is travelling independently of the group of convoy vehicles.

The position information sharing portion 74a transmits plural pieces of coordinate information, which is indicative of a trail of its own vehicle that has been positioned by the positioning portion 10, to the follower vehicle (following vehicle) via the communication portion 30. Here, the position information sharing portion 74a may wirelessly transmit plural pieces of coordinate information, which is indicative of a trail of its own vehicle that has been positioned by the positioning portion 10, over broadcasting.

The identification information sharing portion 74b receives the identification numbers (license plate numbers) allocated to the convoy vehicles incorporated in the group of convoy vehicles, via the communication portion 30. The identification information sharing portion 74b transmits the identification number allocated to its own vehicle incorporated in the group of convoy vehicles.

The state information sharing portion 74c receives information (state information), which indicates a state in front of or behind the group of convoy vehicles, via the communication portion 30. Furthermore, the state information sharing portion 74c transmits the information indicative of the state in front of or behind the group of convoy vehicles. For example, the state information sharing portion 74c generates state information indicative of the presence of an obstacle ahead, and transmits the generated state information to the follower vehicle (following vehicle).

Here, the state information sharing portion 74c may wirelessly transmit state information over broadcasting.

Note that the control-system communication conducted by the joining control portion 72 and the information sharing portion 74 is, for example, communication based on the 802.11 standard. The control-system communication is not limited to communication based on the 802.11 standard, but may be communication based on any communication standard.

According to the information indicative of the state in front of or behind the group of convoy vehicles, the travel control portion 71 controls the travel of the group of convoy vehicles. If the information indicative of the state in front of or behind the group of convoy vehicles is information indicative of a predetermined first event, then the travel control portion 71 orders the inter-vehicular distance control portion 50 to make longer the inter-vehicular distance between the convoy vehicles. The predetermined first event is, for example, the presence of an obstacle.

If the information indicative of the state in front of or behind the group of convoy vehicles is information indicative of a predetermined second event, then the travel control portion 71 orders the lane keeping control portion 60 to change the position of its own vehicle with respect to the lanes (for example, to give way to an emergency vehicle). The predetermined second event is, for example, an approach of an emergency vehicle or the like.

Note that if an emergency vehicle or the like approaches the group of convoy vehicles, then the travel control portion 71 may pull over the convoy vehicles to a side of the road, pull over the convoy vehicles to a side of the road so that each of them is diagonal with respect to the driving lane, or pull over the convoy vehicles to the sides of the road so that the forward and rear convoy vehicles are arranged in a staggered manner, to thereby let the emergency vehicle pass whenever and wherever possible.

Figure 16:
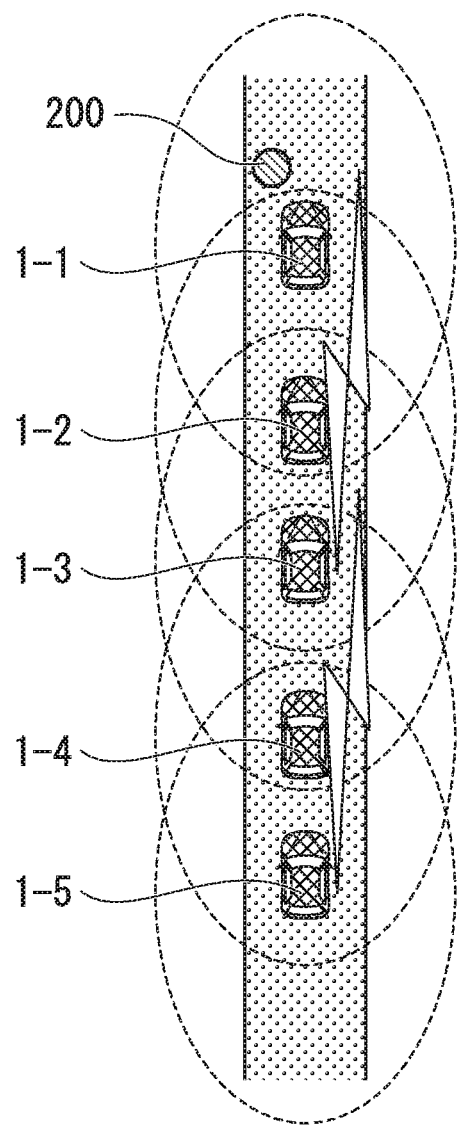
FIG. 16 is a diagram showing a first example of positional relationship among vehicles in the case where a leading vehicle notifies follower vehicles of an event ahead, according to the first embodiment of the present invention.

FIG. 16 is a diagram showing a first example of positional relationship among the vehicles in the case where a leading vehicle notifies follower vehicles of an event ahead. In FIG. 16, a communication vehicle 1-1 is a leading vehicle. It is supposed that, in front of the communication vehicle 1-1, there is an event 200 (for example, a situation in which an obstacle is present on the road). A communication vehicle 1-2 to a communication vehicle 1-5 are follower vehicles. Ranges in which vehicle-to-vehicle communication through direct wireless communication is available are each denoted with a broken line.

Here, the communication vehicle 1-5 is a tail end vehicle. Furthermore, it is supposed that the communication vehicle 1-1 (leading vehicle) and the communication vehicle 1-5 (tail end vehicle) are communication vehicles that are away from each other by more than a distance at which direct wireless communication is available. The driver of the communication vehicle 1-5 (tail end vehicle) is not capable of directly seeing the event 200 in front of the communication vehicle 1-1.

The communication vehicle 1-5 receives state information, which has been transferred from the communication vehicle 1-1 via the communication vehicle 1-2 to the communication vehicle 1-4 (follower vehicles), through vehicle-to-vehicle communication. The presentation portion 80 displays information indicative of the event 200 in the information display area 85 of its own vehicle. Furthermore, the communication vehicle 1-5 receives image information, which has been transferred from the communication vehicle 1-1 to the communication vehicle 1-2 through the communication vehicle 1-4 (follower vehicles), through vehicle-to-vehicle communication. The presentation portion 80 displays a motion picture image, in which the event 200 is imaged, in the forward video display area 810 of its own vehicle. Similar operations apply also to the communication vehicle 1-2 to the communication vehicle 1-4 (follower vehicles). The drivers of the communication vehicle 1-2 to the communication vehicle 1-5 (follower vehicles) are capable of learning the information indicative of the event 200 in advance.

Figure 17:
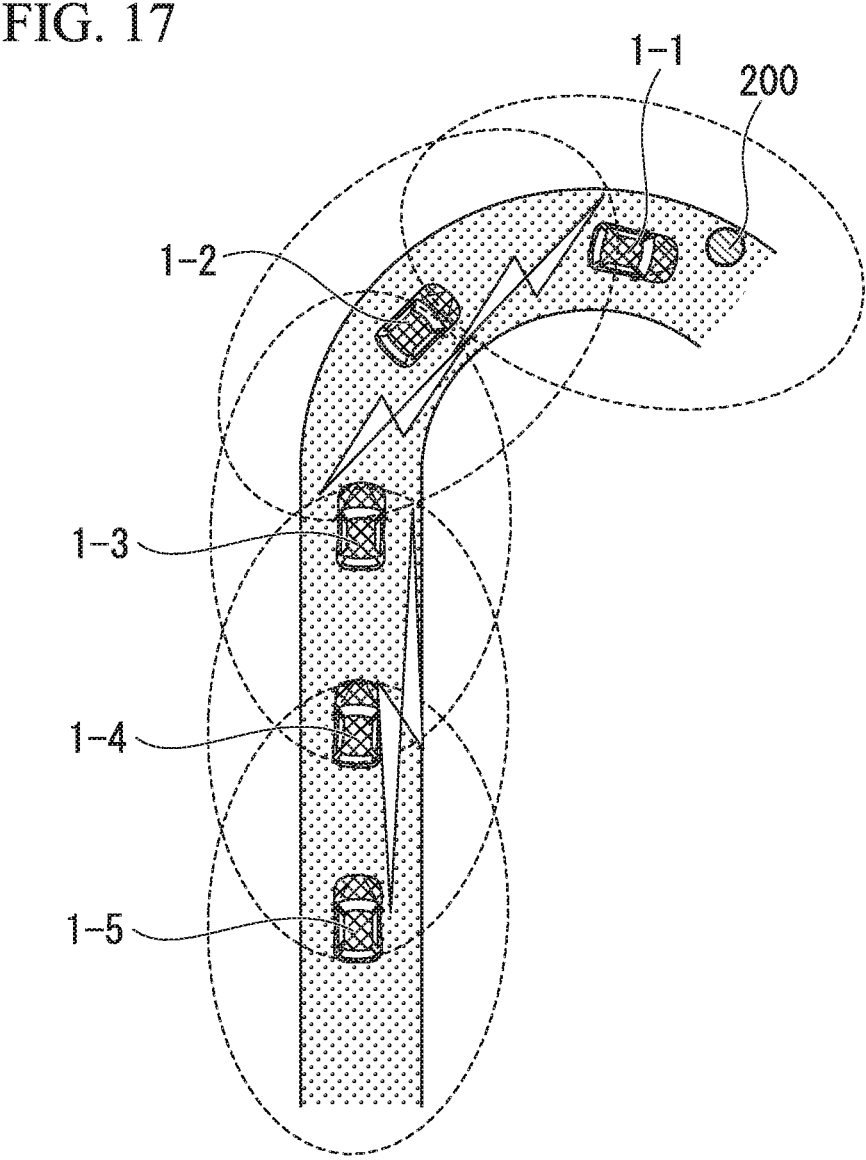
FIG. 17 is a diagram showing a second example of positional relationship among vehicles in the case where a leading vehicle notifies follower vehicles of an event ahead, according to the first embodiment of the present invention.

FIG. 17 is a diagram showing a second example of positional relationship among the vehicles in the case where a leading vehicle notifies follower vehicle of an event ahead. In FIG. 17, it is supposed that there is an event 200 ahead of the blind curve on which the group of convoy vehicles (the communication vehicle 1-1 to the communication vehicle 1-5) shown in FIG. 16 are travelling. The sides of the blind curve may have a wall capable of shielding radio waves. Here, the driver of the communication vehicle 1-5 (tail end vehicle) is not capable of directly seeing the event 200 in front of the communication vehicle 1-1. In FIG. 17, ranges in which vehicle-to-vehicle communication through direct wireless communication is available are each denoted with a broken line.

The communication vehicle 1-5 receives state information, which has been transferred from the communication vehicle 1-1 sequentially to the communication vehicle 1-2 through the communication vehicle 1-4 (follower vehicles), through vehicle-to-vehicle communication. The presentation portion 80 displays information indicative of the event 200 in the information display area 85 of its own vehicle. Furthermore, the communication vehicle 1-5 receives image information, which has been transferred from the communication vehicle 1-1 sequentially to the communication vehicle 1-2 through the communication vehicle 1-4 (follower vehicles), through vehicle-to-vehicle communication. The presentation portion 80 displays a motion picture image, in which the event 200 is imaged, in the forward video display area 810 of its own vehicle. Similar operations apply also to the communication vehicle 1-2 to the communication vehicle 1-4 (follower vehicles). The drivers of the communication vehicle 1-2 to the communication vehicle 1-5 (follower vehicles) are capable of learning information indicative of the event 200 in advance.

Figure 18:
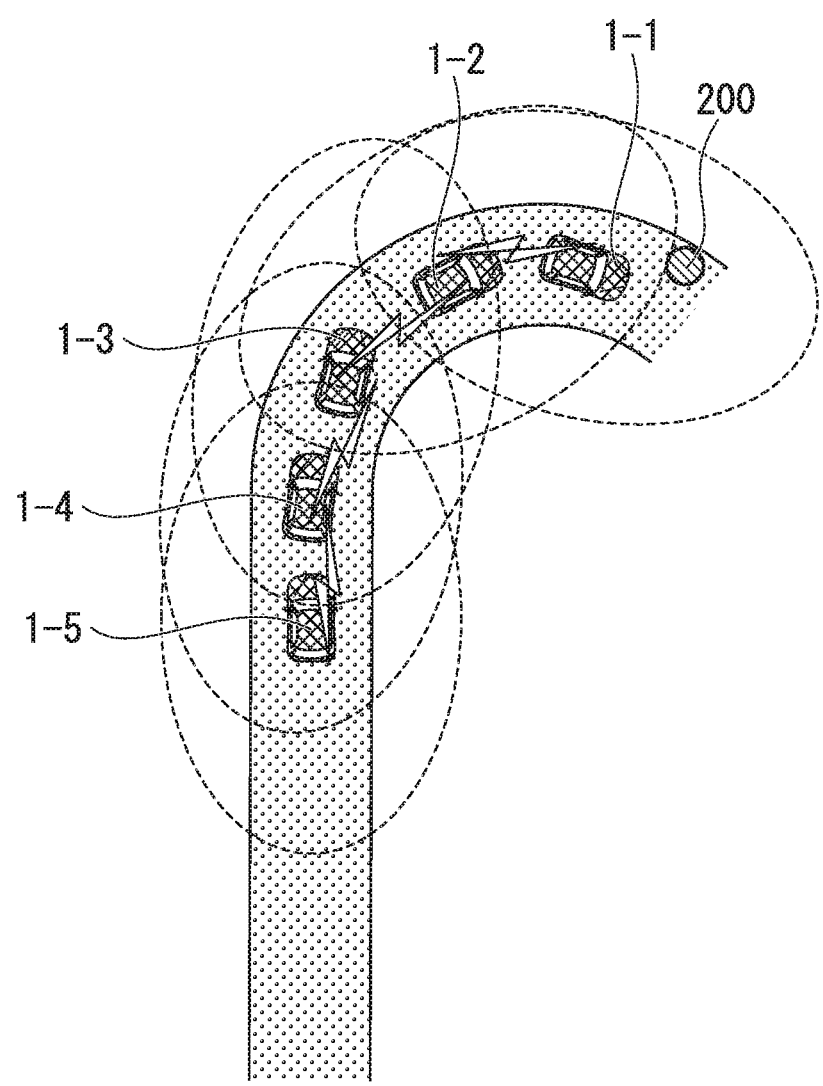
FIG. 18 is a diagram showing a third example of positional relationship among vehicles in the case where a leading vehicle notifies follower vehicles of an event ahead, according to the first embodiment of the present invention.

FIG. 18 is a diagram showing a third example of positional relationship among the vehicles in the case where a leading vehicle notifies follower vehicles of an event ahead. If an inter-vehicular distance and a difference in speed between convoy vehicles are within predetermined ranges (the vehicles are travelling in convoy), then the inter-vehicular distance control portion 50 makes the inter-vehicular distance shorter than the case where the inter-vehicular distance or the difference in speed between the convoy vehicles is not within the predetermined range (the vehicles are not travelling in convoy). In FIG. 18, the inter-vehicular distance between the convoy vehicles is shorter than that of the case shown in FIG. 17. The shorter the inter-vehicular distance between the convoy vehicles is, the shorter the communication distance between the convoy vehicles is. In addition, because visibility between the convoy vehicles is secured, data transfer rate through wireless communication improves even at a blind curve.

Figure 19:
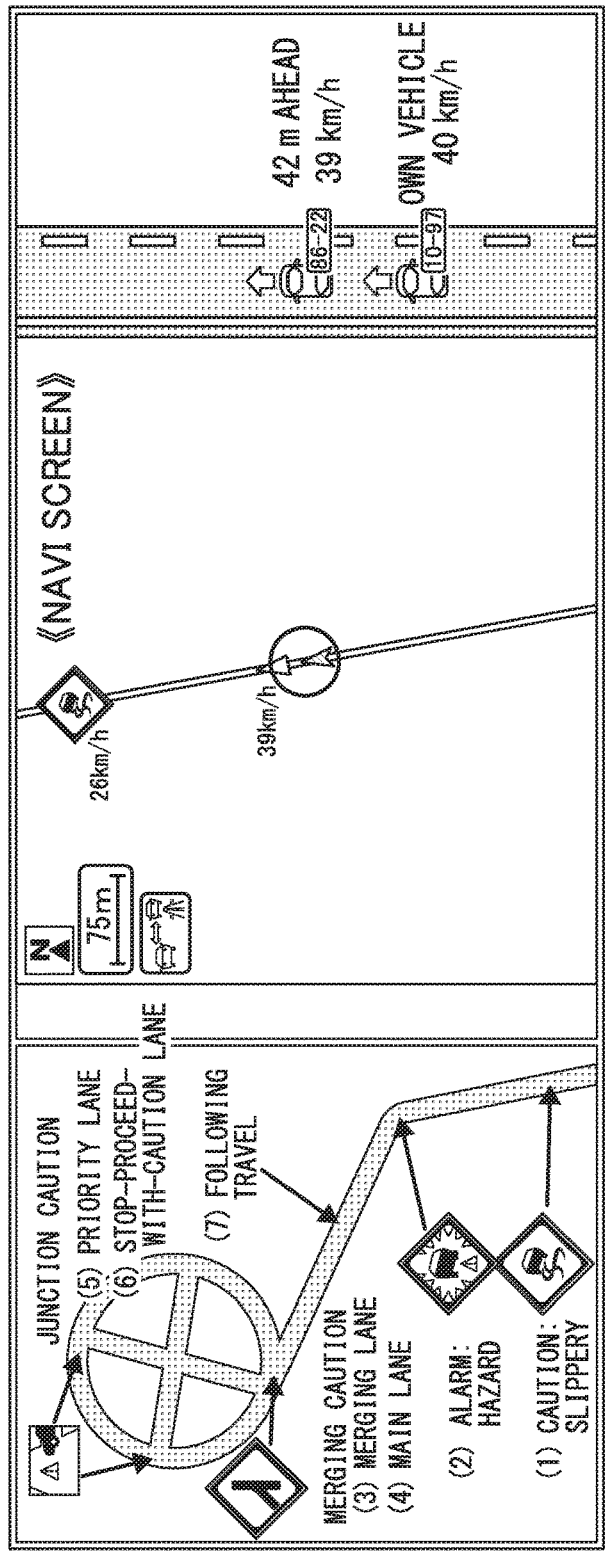
FIG. 19 is a diagram showing an exemplary presentation by a presentation portion that notifies events ahead, according to the first embodiment of the present invention.

FIG. 19 is a diagram showing an exemplary presentation by the presentation portion 80 that notifies an event ahead. The presentation portion 80 displays information indicative of the event 200 together with map information. In FIG. 19, as examples of information indicative of the event 200, the presentation portion 80 displays slippage information, hazard alarm, merging caution information (merging lane, main lane), junction caution information (priority lane, stop-proceed-with-caution lane), and following travel information.

Figure 20:
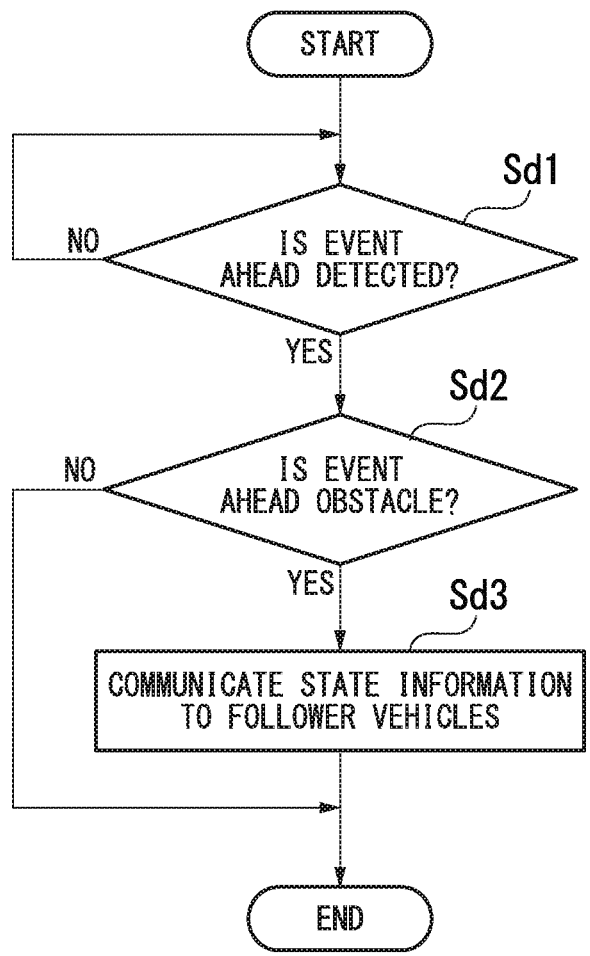
FIG. 20 is a flow chart showing an exemplary operational procedure of a preceding vehicle as a convoy vehicle, according to the first embodiment of the present invention.

FIG. 20 is a flow chart showing an exemplary operational procedure of a preceding vehicle as a convoy vehicle.

(Step Sd1)

The travel control portion 71 determines whether or not the event 200 ahead has been detected by the sensor portion 40 or the like. If the event 200 ahead has been detected (Step Sd1: YES), then the travel control portion 71 moves the process to Step Sd2. On the other hand, if the event 200 ahead has not been detected (Step Sd1: NO), then the travel control portion 71 repeats Step Sd1.

(Step Sd2)

The travel control portion 71 determines whether the event 200 ahead is an obstacle or not. If the event 200 ahead is an obstacle (Step Sd2: YES), then the travel control portion 71 moves the process to Step Sd3. On the other hand, if the event 200 ahead is not an obstacle (Step Sd2: NO), then the travel control portion 71 terminates the processing.

(Step Sd3)

The state information sharing portion 74c generates state information indicating that there is an obstacle ahead, and transmits the generated state information to the follower vehicles (following vehicles). Here, the state information sharing portion 74c wirelessly transmits the state information over broadcasting. The travel control portion 71 terminates the processing.

Figure 21:
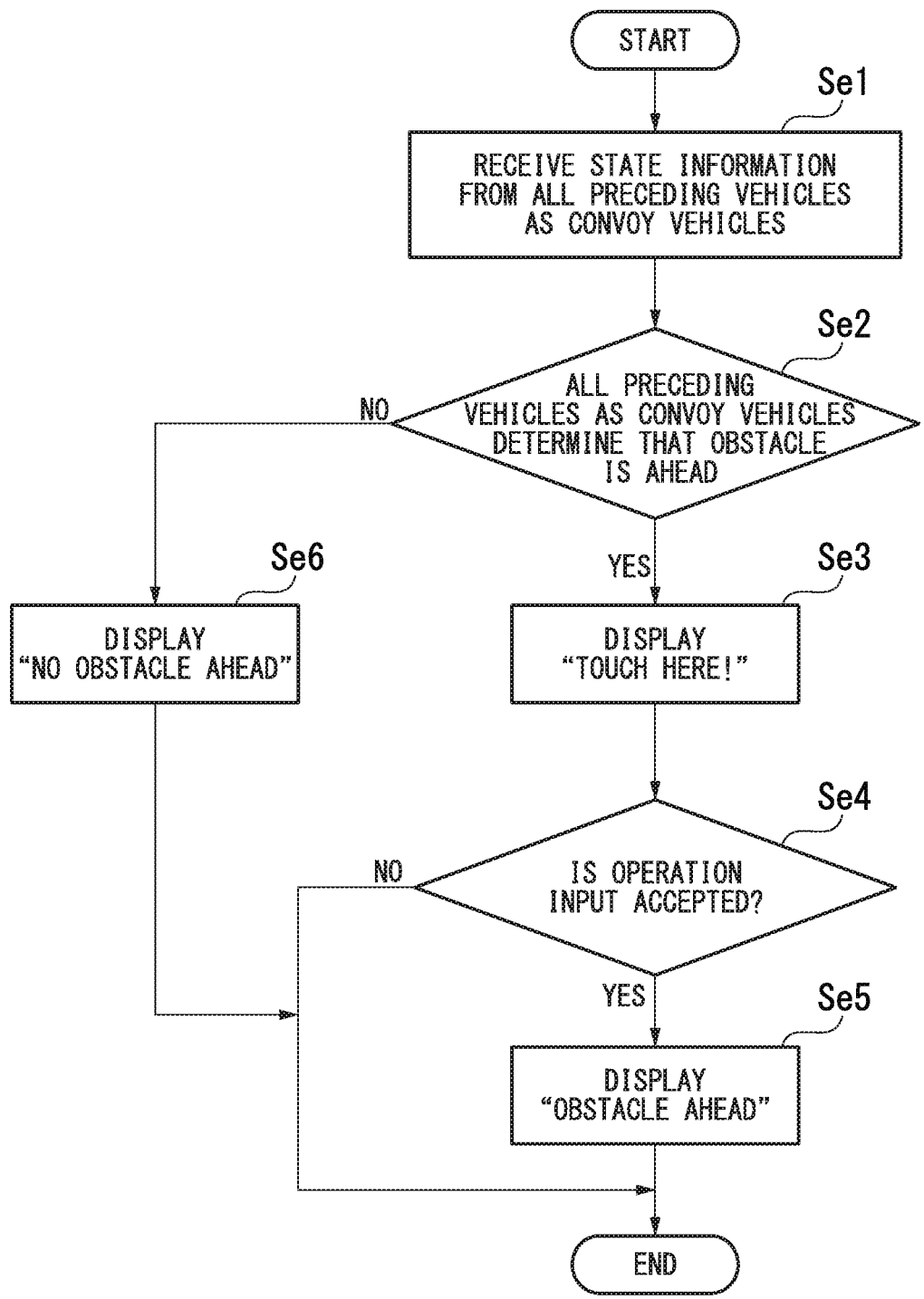
FIG. 21 is a flow chart showing an exemplary operational procedure of a follower vehicle, according to the first embodiment of the present invention.

FIG. 21 is a flow chart showing an exemplary operational procedure of a follower vehicle.

(Step Se1)

The state information sharing portion 74c receives state information from all the preceding vehicle as convoy vehicles.

(Step Se2)

The travel control portion 71 determines whether or not all the preceding vehicles as convoy vehicles have determined that there is an obstacle ahead. If all the preceding vehicles as convoy vehicles have determined that there is an obstacle ahead (Step Se2: YES), then the presentation portion 80 moves the process to Step Se3. On the other hand, if any preceding vehicle as a convoy vehicle has determined that there is not an obstacle ahead (Step Se2: NO), then the presentation portion 80 moves the process to Step Se6.

(Step Se3)

The presentation portion 80 displays the string of characters and the like "Touch here!" For example, the presentation portion 80 displays the string of characters and the like "Touch here!" together with a graphical diagram. The presentation portion 80 moves the process to Step Se4.

(Step Se4)

The travel control portion 71 determines whether the operation input portion 90 has accepted an operation input within a predetermined period of time or not. If the operation input portion 90 has accepted the operation input within the predetermined period of time (Step Se4: YES), then the presentation portion 80 moves the process to Step Se5. On the other hand, if the operation input portion 90 has not accepted the operation input within the predetermined period of time (Step Se4: NO), then the travel control portion 71 terminates the processing.

(Step Se5)

The presentation portion 80 displays the string of characters "Obstacle ahead". For example, the presentation portion 80 displays the string of characters "Obstacle ahead" together with a graphical diagram (for example, see FIG. 19). Furthermore, for example, the presentation portion 80 vocally outputs the string of characters "Obstacle ahead".

(Step Se6)

The presentation portion 80 displays the string of characters "No obstacle ahead". For example, the presentation portion 80 displays the string of characters "No obstacle ahead" together with a graphical diagram. Furthermore, for example, the presentation portion 80 vocally outputs the string of characters "No obstacle ahead".

As described above, a convoy travel control apparatus 100 includes: a communication portion 30 that communicates with another vehicle; a travel control portion 71 that actualizes a convoy travel with another vehicle through communication via the communication portion 30; and a joining control portion 72, wherein when an own vehicle is travelling in convoy, if the communication portion 30 receives, from an independent vehicle which is not incorporated in a group of convoy vehicles travelling in convoy, request information to incorporate the independent vehicle into the group of convoy vehicles, then the joining control portion 72 determines a positional relationship between a position of the group of convoy vehicles and a position of the independent vehicle, and, according to the determined positional relationship, exercises control, which is for incorporating the independent vehicle into the group of convoy vehicles, on the group of convoy vehicles via the communication portion 30.

With this structure, the joining control portion 72 determines the positional relationship between the position of the group of convoy vehicles and the position of the independent vehicle. According to the determined positional relationship, the joining control portion 72 exercises control for incorporating the independent vehicle into the group of convoy vehicles onto the group of convoy vehicles via the communication portion 30. As a result, the convoy travel control apparatus 100 is capable of speedily merging the independent vehicle with the group of convoy vehicles. For example, the convoy travel control apparatus 100 is capable of speedily merging the independent vehicle with the group of convoy vehicles at its head or tail end.

The convoy travel control apparatus 100 allows the speed of the convoy vehicles, the inter-vehicular distance, and the control-system information to be shared among the convoy vehicles. The convoy travel control apparatus 100 is capable of minimizing the operations which are required for the driver at the formation and termination of convoy.

The convoy travel control apparatus 100 transmits, via the communication portion, information that requires the joining control portion 72 to decelerate the group of convoy vehicles if the independent vehicle is travelling behind the group of convoy vehicles, and that requires the joining control portion 72 to accelerate the group of convoy vehicles if the independent vehicle is travelling in front of the group of convoy vehicles.

The convoy travel control apparatus 100 includes: a sensor portion 40 that measures an inter-vehicular distance between its own vehicle and a preceding vehicle; an inter-vehicular distance control portion 50 that controls a travel drive portion of its own vehicle so that the inter-vehicular distance measured by the sensor portion 40 is a set distance; and a lane keeping control portion 60 that controls a steering portion of its own vehicle so that its own vehicle does not deviate from a driving lane, wherein the travel control portion 71 determines whether the inter-vehicular distance and the difference in speed between convoy vehicles incorporated in a group of convoy vehicles are within predetermined ranges (formation of convoy is completed) or not, and wherein, if the inter-vehicular distance and the difference in speed between the convoy vehicles are within the predetermined ranges, then the travel control portion 71 causes its own vehicle to travel in convoy based on control by the inter-vehicular distance control portion 50 and on control by the lane keeping control portion 60.

As a result, the convoy travel control apparatus 100 is capable of reducing a load on the driver.

If the convoy travel control apparatus 100, if its own vehicle is travelling in convoy, then the travel control portion 71 orders the inter-vehicular distance control portion 50 to perform inter-vehicular distance control with the set distance shorter than the case where its own vehicle is not travelling in convoy.

As a result, the convoy travel control apparatus 100 is capable of maintaining the state in which communication is conducted at a shorter distance. Therefore, it is possible to conduct vehicle-to-vehicle (V2V) communication in a stable state. Furthermore, the convoy travel control apparatus 100 is capable of preventing another vehicle from cutting into the group of convoy vehicles.

The convoy travel control apparatus 100 is a convoy travel control apparatus wherein if an independent vehicle is travelling behind a group of convoy vehicles, then the joining control portion 72 generates information of speed change request that accelerates the independent vehicle, wherein if an independent vehicle is travelling in front of a group of convoy vehicles, then the joining control portion 72 generates information of speed change request that decelerates the independent vehicle, and wherein the joining control portion 72 transmits the generated information of speed change request to the independent vehicle via the communication portion 30.

The convoy travel control apparatus 100 includes a sensor portion 40 that measures an inter-vehicular distance between its own vehicle and a preceding vehicle, wherein the joining control portion 72 calculates a position of the preceding vehicle based on the inter-vehicular distance measured by the sensor portion 40, and wherein if a distance between the calculated position of the preceding vehicle and a position of a convoy vehicle incorporated into the group of convoy vehicles that has been obtained through vehicle-to-vehicle communication is within a predetermined distance, then the joining control portion 72 determines that the preceding vehicle is a convoy vehicle.

The convoy travel control apparatus 100 includes: a forward imaging portion 21 that takes an image of a preceding vehicle; an image recognition portion 71a that, based on an image taken by the forward imaging portion 21, recognizes an identification number allocated to the imaged preceding vehicle; and an identification information sharing portion 74b that receives an identification number allocated to a convoy vehicle incorporated into the group of convoy vehicles, wherein if the identification number allocated to the imaged preceding vehicle matches with the identification number allocated to the convoy vehicle, then the joining control portion 72 determines that the imaged preceding vehicle is a convoy vehicle.

The convoy travel control apparatus 100 includes a state information sharing portion 74c that receives information indicative of a state in front of or behind the group of convoy vehicles, wherein according to the information indicative of the state in front of or behind the group of convoy vehicles, the travel control portion 71 controls travel of the group of convoy vehicles.

In convoy travel control apparatus 100, if the information indicative of the state in front of or behind the group of convoy vehicles is information indicative of a predetermined event, then the travel control portion 71 orders the inter-vehicular distance control portion 50 to change the inter-vehicular distance.

In convoy travel control apparatus 100, if the information indicative of the state in front of or behind the group of convoy vehicles is information indicative of a predetermined event, then the travel control portion 71 orders the lane keeping control portion 60 to change a positon of its own vehicle with respect to a lane.

The convoy travel control apparatus 100 includes a communication control portion 73, wherein if the communication portion 30 receives at least either of image information in which an interior of a convoy vehicle incorporated in the group of convoy vehicles is taken and voice information collected from the interior of the convoy vehicle, then according to the information indicative of the state in front of or behind the group of convoy vehicles, the communication control portion 73 controls the presentation portion 80 so as to present at least either of the image information and the voice information.

In the convoy travel control apparatus 100, the communication control portion 73 transmits the voice information, which has been collected from its own vehicle, via the communication portion 30 based on an operation input.

As a result, the convoy travel control apparatus 100 is capable of allowing the driver and/or passenger(s) in the communication vehicle and the driver and/or passenger(s) in another communication vehicle to communicate with each other in the motion picture image and the voice. The convoy travel control apparatus 100 exercises inter-vehicular distance control and lane keeping control. Therefore, the convoy travel control apparatus 100 is capable of allowing the driver in a communication vehicle and the driver in another communication vehicle to communicate with each other.

The convoy travel control apparatus 100 includes a storage portion 95 that stores point information granted to a driver according to experience of driving a convoy vehicle, wherein the presentation portion 80 presents the point information.

The convoy travel control apparatus 100 is a convoy travel control apparatus wherein the storage portion 95 stores point information granted to a driver according to experience that satisfies a preset condition.

The convoy travel control apparatus 100 is a convoy travel control apparatus wherein the position information sharing portion 74a receives information indicative of a trail of a preceding vehicle and wherein the travel control portion 71 causes its own vehicle to follow the trail.

As a result, a follower vehicle (following vehicle) is capable of changing lanes in the same trail as that of the preceding vehicle.

Second Embodiment

A convoy travel control apparatus 100 of a second embodiment is different from that of the first embodiment in that the latter has a function for allowing an independent vehicle to merge with a group of convoy vehicles by cutting in between convoy vehicles incorporated in the group of convoy vehicles (by having an independent vehicle cut in between convoy vehicles by giving way in merging). In the second embodiment, only the difference from the first embodiment will be described.

Figure 22:
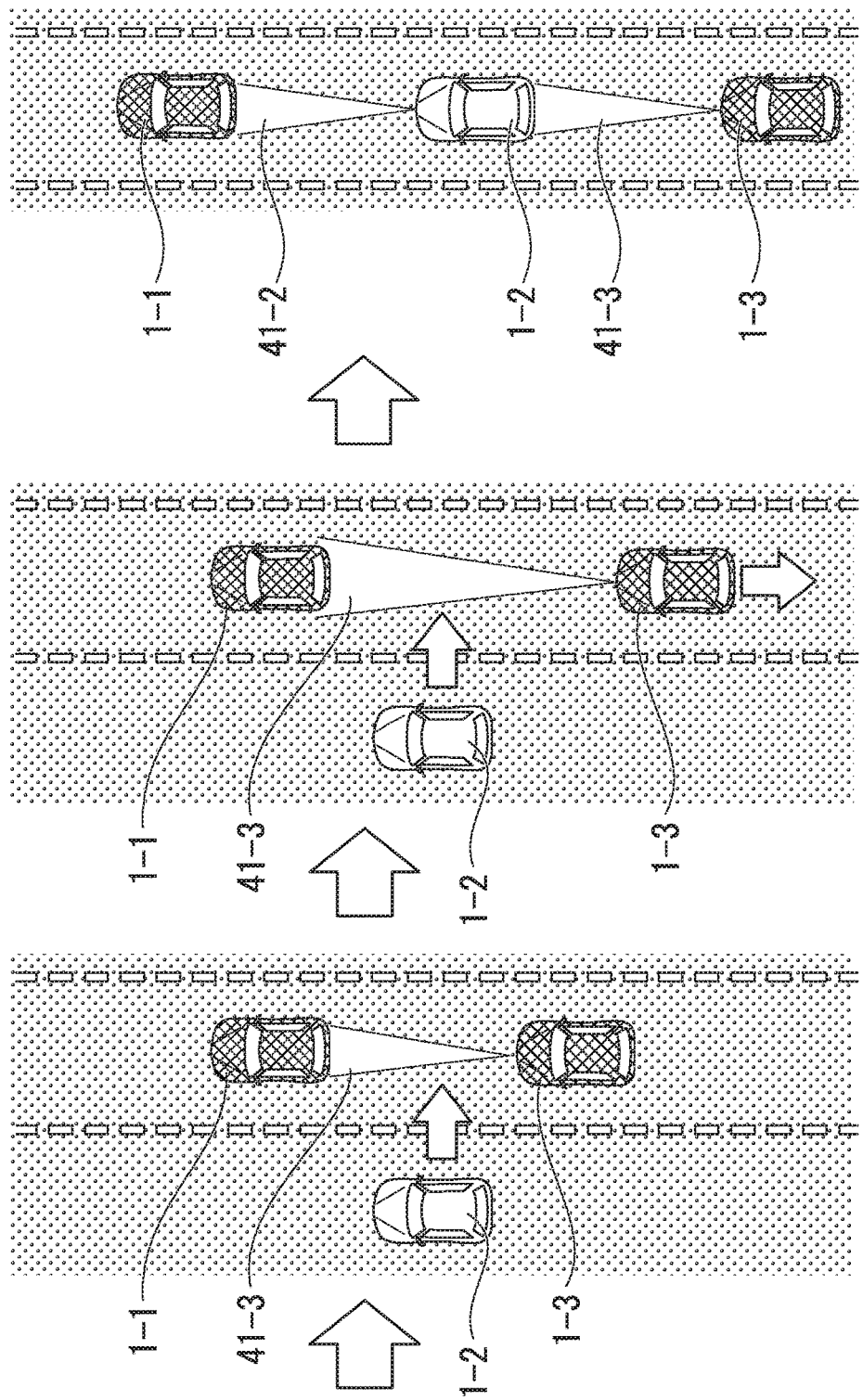
FIG. 22 is a diagram showing a method in which an independent vehicle cuts in between and merges with convoy vehicles, according to a second embodiment of the present invention.

FIG. 22 is a diagram showing a method in which an independent vehicle cuts in between convoy vehicles to merge therewith. In FIG. 22, a communication vehicle 1-1 and a communication vehicle 1-3 are adjacent convoy vehicles incorporated in the same group of convoy vehicles. On the other hand, a communication vehicle 1-2 is an independent vehicle, and transmits request information to incorporate the communication vehicle 1-2 into the group of convoy vehicles, to the communication vehicle 1-1 and the communication vehicle 1-3. Here, if a fifth operation key 824 (see FIG. 14) is operated in the communication vehicle 1-2, then a joining control portion 72 of the communication vehicle 1-2 transmits request information to incorporate the communication vehicle 1-2 into the group of convoy vehicles, to the communication vehicle 1-1 and the communication vehicle 1-3.

It is supposed that the driver of the communication vehicle 1-3 has approved the request information to incorporate the independent vehicle into the group of convoy vehicles and has operated on the fourth operation key 823 (see FIG. 14). Note that, with the approval of the request information to incorporate the independent vehicle into the group of convoy vehicles (giving way in merging), point information is granted to the driver of the communication vehicle 1-3. The point information is stored in the storage portion 95 (see FIG. 2) of the convoy travel control apparatus 100 that is mounted in the communication vehicle 1-3.

Based on the output(s) from at least either of the positioning portion 10 and the sensor portion 40, the travel control portion 71 determines a positional relationship between a position of the group of convoy vehicles and a position of the independent vehicle. For example, if the independent vehicle is positioned nether in the forward direction nor in the opposite direction of the group of convoy vehicles with respect to the group of convoy vehicles, then the travel control portion 71 determines that the independent vehicle is to merge with the group of convoy vehicles from a side of the group of convoy vehicles.

As shown on the left side of FIG. 22, the convoy vehicle that is travelling in convoy at the position closest to the communication vehicle 1-3 is the communication vehicle 1-1. If the communication vehicle 1-2 is not positioned within the range of the beam 41-3 of the sensor portion 40 of the communication vehicle 1-3, then based on the information indicative of the position of the communication vehicle 1-2 that has been received by the position information sharing portion 74a, the travel control portion 71 of the communication vehicle 1-3 orders the inter-vehicular distance control portion 50 and the lane keeping control portion 60 to keep constant the distance between the communication vehicle 1-2 and the communication vehicle 1-3.

As shown at the center of FIG. 22, the inter-vehicular distance control portion 50 of the communication vehicle 1-3 decelerates to make the inter-vehicular distance to communication vehicle 1-2 longer so that the communication vehicle 1-2 can merge (can be incorporated) between the communication vehicle 1-1 and the communication vehicle 1-3. Here, the travel control portion 71 of the communication vehicle 1-3 determines whether the inter-vehicular distance between the communication vehicle 1-1 and the communication vehicle 1-3 is a predetermined inter-vehicular distance that allows for incorporation into the group of convoy vehicles or not. The state information sharing portion 74c transmits the information, which indicates whether the inter-vehicular distance has come to allow for incorporation into the group of convoy vehicles or not, to the communication vehicle 1-2.

If the communication vehicle 1-2 is not positioned within the range of the beam 41-3 of the sensor portion 40 of the communication vehicle 1-3, then based on the information indicative of the position of the communication vehicle 1-2 that has been received by the position information sharing portion 74a, the travel control portion 71 of the communication vehicle 1-3 orders the inter-vehicular distance control portion 50 and the lane keeping control portion 60 to keep the distance between the communication vehicle 1-2 and the communication vehicle 1-3 equal to the inter-vehicular distance at the time of travelling in convoy.

As shown on the right side of FIG. 22, based on the control by the inter-vehicular distance control portion 50 of the communication vehicle 1-3 and on the control by the lane keeping control portion 60 of the communication vehicle 1-3, the travel control portion 71 of the communication vehicle 1-3 causes the communication vehicle 1-2 as an independent vehicle to merge with the communication vehicle 1-1 and the communication vehicle 1-3, to thereby complete the formation of convoy. Here, the steering to merge the communication vehicle 1-2 as an independent vehicle with the group of convoy vehicles is conducted by the driver. With the operation on the second operation key 821 (see FIG. 14), the driver of the communication vehicle 1-2 causes the string of characters and the like "Thank you (graphical diagram)" indicative of a message to be displayed in the message display area 83 of the presentation portion 80 of the communication vehicle 1-3.

If the communication vehicle 1-2 is positioned within the range of the beam 41-3 of the sensor portion 40 of the communication vehicle 1-3, then based on the inter-vehicular distance measured by the sensor portion 40, the travel control portion 71 of the communication vehicle 1-3 orders the inter-vehicular distance control portion 50 to keep the distance between the communication vehicle 1-2 and the communication vehicle 1-3 equal to the inter-vehicular distance at the time of travelling in convoy.

Figure 23:
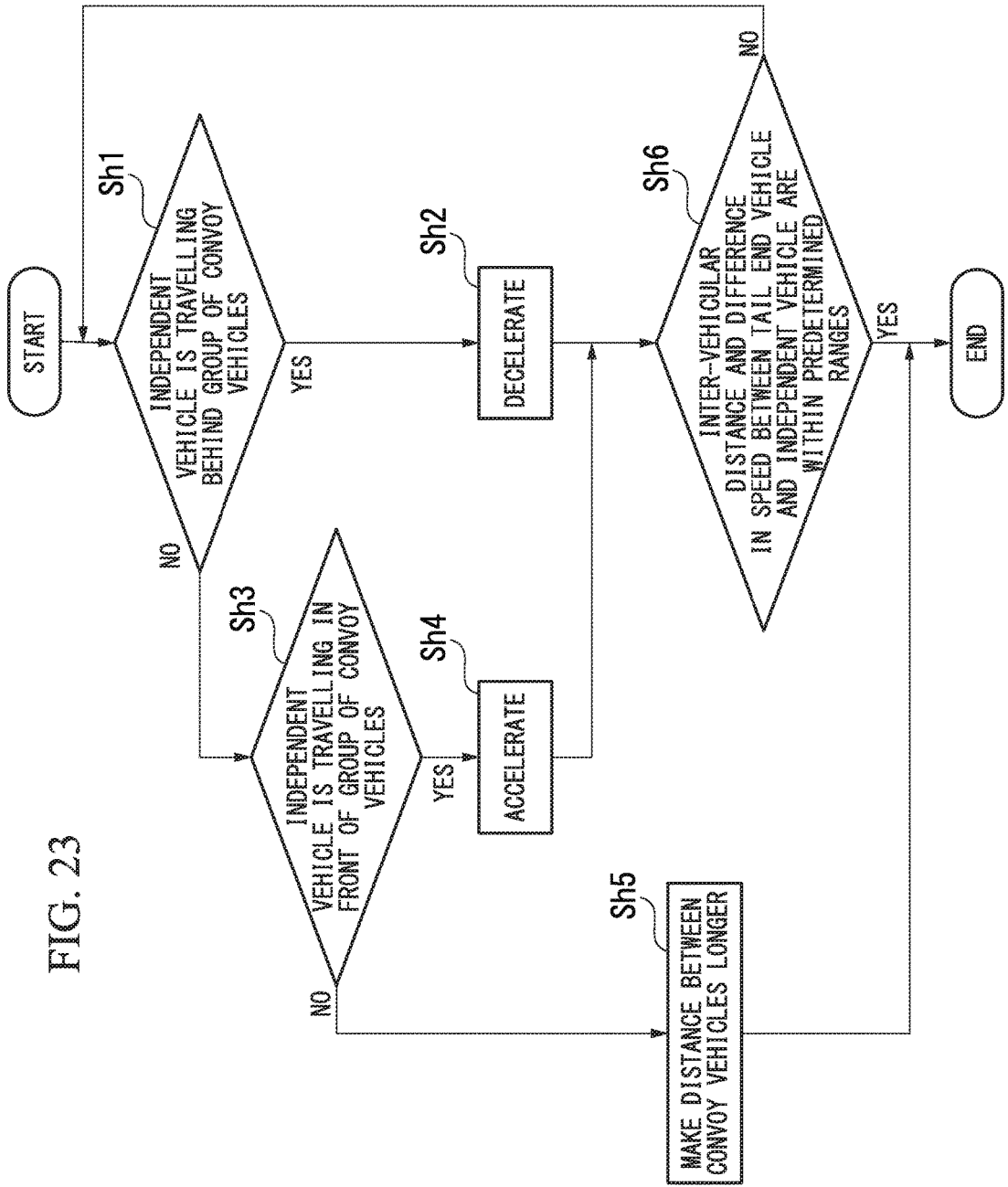
FIG. 23 is a flow chart showing an operational procedure in convoy formation mode in which an independent vehicle merges with a group of convoy vehicles from a side of the group of convoy vehicles, according to the second embodiment of the present invention.

FIG. 23 is a flow chart showing an operational procedure in which, in convoy formation mode, an independent vehicle merges with a group of convoy vehicles from a side of the group of convoy vehicles. Step Sh1 to Step Sh6 are an operational procedure that is performed by the convoy travel control apparatus 100 mounted in a convoy vehicle. Step Sh1 to Step Sh4 are similar to Step Sb1 to Step Sb4 shown in FIG. 10. Furthermore, Step Sh6 is similar to Step Sb6 shown in FIG. 10.

(Step Sh5)

If the independent vehicle is travelling along the side of the group of convoy vehicles when request information to incorporate the independent vehicle into the group of convoy vehicles is received, then the travel control portion 71 orders the inter-vehicular distance control portion 50 to make longer the inter-vehicular distance between the convoy vehicles in the group of convoy vehicles into which the independent vehicle is to be incorporated, to thereby control the group of convoy vehicles. Here, the travel control portion 71 transmits the request information to make the inter-vehicular distance longer from the joining control portion 72 to other convoy vehicles, to thereby make longer the inter-vehicular distance between the other convoy vehicles. Here, as the other convoy vehicles, two convoy vehicles that are closest to the independent vehicle are selected out of the convoy vehicles into which the independent vehicle is to be incorporated.

As described above, a convoy travel control apparatus 100 includes: a communication portion 30 that communicates with another vehicle; a travel control portion 71 that actualizes travel in convoy with the another vehicle through communication via the communication portion 30; and a joining control portion 72, wherein when its own vehicle is travelling in convoy while being incorporated in a group of vehicles travelling in convoy, if the communication portion 30 receives, from an independent vehicle that is not incorporated in the group of vehicles travelling in convoy, request information to incorporate the independent vehicle into the group of convoy vehicles, then the joining control portion 72 determines a positional relationship between a position of the group of convoy vehicles and a position of the independent vehicle, and wherein if the independent vehicle is travelling along a side of the group of convoy vehicles, then in order to incorporate the independent vehicle into the group of convoy vehicles, the joining control portion 72 exercises control of making an inter-vehicular distance between convoy vehicles of the group of convoy vehicles, into which the independent vehicle is to be incorporated, on the group of convoy vehicles via the communication portion 30

With this structure, when its own vehicle is travelling in convoy, if the communication portion 30 receives, from an independent vehicle that is not incorporated in the group of vehicles travelling in convoy, request information to incorporate the independent vehicle into the group of convoy vehicles, then the joining control portion 72 determines a positional relationship between a position of the group of convoy vehicles and a position of the independent vehicle, and if the independent vehicle is travelling along a side of the group of convoy vehicles, then in order to incorporate the independent vehicle into the group of convoy vehicles, the joining control portion 72 exercises control of making an inter-vehicular distance between convoy vehicles of the group of convoy vehicles, into which the independent vehicle is to be incorporated, on the group of convoy vehicles via the communication portion 30.

As a result, the convoy travel control apparatus 100 is capable of speedily merging an independent vehicle with a group of convoy vehicles. For example, the convoy travel control apparatus 100 is capable of speedily merging an independent vehicle between convoy vehicles of the group of convoy vehicles into which the independent vehicle is to be incorporated. The convoy travel control apparatus 100 is capable of minimizing the operation required for the driver in giving way in merging.

The convoy travel control apparatus 100 includes: a presentation portion 80 that presents a fact that the communication portion 30 has received a request to incorporate the independent vehicle into the group of convoy vehicles.

The convoy travel control apparatus 100 includes an operation input portion 90 that accepts an operation input for selecting whether to approve the request to incorporate the independent vehicle into the group of convoy vehicles or not, wherein the joining control portion 72 transmits information, which indicates the operation input, to the independent vehicle via the communication portion 30.

In the convoy travel control apparatus 100, the presentation portion 80 presents information indicative of a position of the independent vehicle.

In the convoy travel control apparatus 100, when its own vehicle is travelling in convoy while being incorporated in the group of convoy vehicles travelling in convoy, the joining control portion 72 determines whether the convoy vehicles have come to be at a predetermined inter-vehicular distance or not, and transmits information, which indicates whether the convoy vehicles have come to be at the predetermined inter-vehicular distance or not, to the independent vehicle via the communication portion 30.

In the convoy travel control apparatus 100, if before incorporation into the group of convoy vehicles, its own vehicle is an independent vehicle and also convoy vehicles come to at the predetermined inter-vehicular distance from each other, the joining control portion 72 causes its own vehicle to be incorporated into the group of convoy vehicles.

The convoy travel control apparatus 100 includes: a sensor portion 40 that measures an inter-vehicular distance between its own vehicle and a preceding vehicle; and an inter-vehicular distance control portion 50 that controls a travel drive portion of its own vehicle so that the inter-vehicular distance measured by the sensor portion 40 is a set distance, wherein the joining control portion 72 determines whether the preceding vehicle is the independent vehicle or not, wherein if the preceding vehicle is the independent vehicle, then based on the inter-vehicular distance measured by the sensor portion 40, the inter-vehicular distance control portion 50 controls the inter-vehicular distance from its own vehicle to the preceding vehicle, and wherein if the preceding vehicle is not the independent vehicle, then based on information indicative of a position of the independent vehicle that has been received by the communication portion 30, the inter-vehicular distance control portion 50 controls the inter-vehicular distance from its own vehicle to the preceding vehicle.

In other words, if an independent vehicle is not present within a beam irradiation range of the sensor portion 40 of a convoy vehicle that is allowed to incorporate the independent vehicle ahead, then based on the information indicative of the position of the independent vehicle that has been received through communication, the convoy travel control apparatus 100 calculates an inter-vehicular distance to the independent vehicle, and causes its own vehicle to travel in convoy so that the inter-vehicular distance is a set distance. This set distance is a distance that makes it easy for an independent vehicle to come in front of its own vehicle. On the other hand, if the independent vehicle is coming ahead to merge, and has come within the beam irradiation range of the sensor portion 40, then the convoy travel control apparatus 100 switches to control of inter-vehicular distance based on the measurement result by the sensor portion 40.

In the convoy travel control apparatus 100, the travel control portion 71 orders the inter-vehicular distance control portion 50 to make the inter-vehicular distance between the independent vehicle and its own vehicle equal to a preset distance.

The convoy travel control apparatus 100 includes: a state information sharing portion 74c that receives information indicative of a state in front of or behind a group of convoy vehicles; and a communication control portion 73 that receives, via the communication portion 30, at least either of image information in which an interior of a convoy vehicle incorporated in the group of convoy vehicles is imaged and voice information collected from the interior, wherein according to the information indicative of the state in front of or behind the group of convoy vehicles, the presentation portion 80 presents at least either of the image information and the voice information.

In the convoy travel control apparatus 100, based on an operation input, the communication control portion 73 transmits the voice information collected from its own vehicle.

The convoy travel control apparatus 100 includes a storage portion 95 that stores point information granted to a driver in accordance with experience of driving a convoy vehicle, wherein the presentation portion 80 presents the point information.

In the convoy travel control apparatus 100, the storage portion 95 stores point information that is granted to the driver according to experience that satisfies a preset condition.

The convoy travel control apparatus 100 includes a position information sharing portion 74a that receives, via the communication portion, information indicative of a trail of a preceding vehicle, wherein the travel control portion 71 causes its own vehicle to follow the trail.

Third Embodiment

A third embodiment is different from the first embodiment and the second embodiment in that the driver of the independent vehicle is capable of selecting from which of front, rear, and side of which convoy vehicle out of the convoy vehicles incorporated in the group of convoy vehicles, he or she can merge with the group of convoy vehicles. In the third embodiment, only the difference from the first embodiment and the second embodiment will be described.

Figure 24:
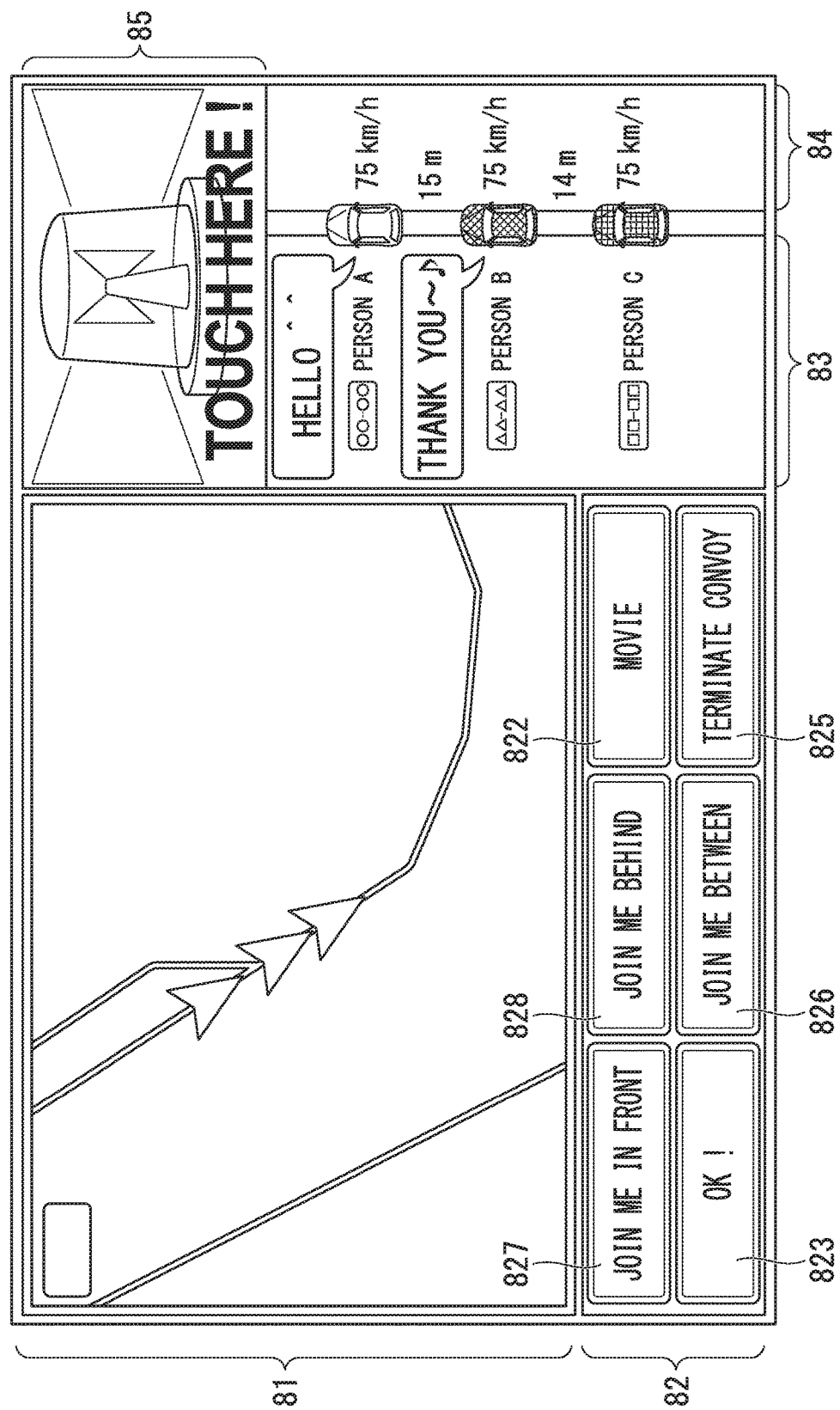
FIG. 24 is a diagram showing a second example of human interface image, according to a third embodiment of the present invention.

FIG. 24 is a diagram showing a second example of human interface image. In the operation key display area 82, there are depressably displayed: a third operation key 822; a fourth operation key 823; a sixth operation key 825; a seventh operation key 826; an eighth operation key 827; and a ninth operation key 828. In the seventh operation key 826, there is displayed "Join me between" as a string of characters that indicates request information to incorporate its own vehicle between convoy vehicles. In the eighth operation key 827, there is displayed "Join me in front" as a string of characters that indicates request information to incorporate its own vehicle into the group of convoy vehicles at the head. In the ninth operation key 828, there is displayed "Join me behind" as a string of characters that indicates request information to incorporate its own vehicle into the group of convoy vehicles at the tail end.

The driver of the independent vehicle selects from which of front, rear, and side of the group of convoy vehicles, its vehicle is to be incorporated into the group of convoy vehicles. Then, according to the selection, the driver depresses the seventh operation key 826, the eighth operation key 827, or the ninth operation key 828. The joining control portion 72 (see FIG. 2) transmits a signal, which indicates request information to incorporate the independent vehicle (own vehicle) into the group of convoy vehicles, and a message according to the depressing operation (for example, the string of characters "Join me between") to the convoy vehicles incorporated in the group of convoy vehicles.

Note that the third operation key 822, the fourth operation key 823, the sixth operation key 825, the seventh operation key 826, the eighth operation key 827, and the ninth operation key 828 may always be displayed in the operation key display area 82 of the presentation portion 80. However, if the own vehicle is not travelling within a predetermined distance from the group of convoy vehicles, then they may not be displayed.

Furthermore, the seventh operation key 826, the eighth operation key 827, and the ninth operation key 828 may be displayed in the operation key display area 82 side by side, or alternatively, based on the positional relationship between the position of the group of convoy vehicles and the position of the independent vehicle, only any one of them may be displayed. For example, based on the position and travel direction of the group of convoy vehicles and on the position of the own vehicle, the joining control portion 72 determines in which of front, rear, and side of the group of convoy vehicles, the own vehicle is positioned. If its own vehicle is travelling in front of the group of convoy vehicles, then the presentation portion 80 may display only the eighth operation key 827 in the operation key display area 82 out of the seventh operation key 826, the eighth operation key 827, and the ninth operation key 828.

As described above, based on the positional relationship between the position of the group of convoy vehicles and the position of its own vehicle, the presentation portion 80 switches operation keys to be displayed.

As a result, the driver is capable of selecting from front, behind, or side of which convoy vehicle out of the convoy vehicles incorporated in the group of convoy vehicles, he or she is to merge with the group of convoy vehicles.

While aspects of the present invention have been described above by use of embodiments, the present invention is not limited to these embodiments at all, and various modifications and replacements can be made without departing from the spirit or scope of the present invention.

BRIEF DESCRIPTION OF THE REFERENCE SYMBOLS

1: communication vehicle (convoy vehicle, independent vehicle, preceding vehicle)
2: non-communication vehicle (preceding vehicle)
10: positioning portion
11: positional range
20: imaging portion
21: forward imaging portion
22: in-vehicle imaging portion
23: microphone
30: communication portion
40: sensor portion
41: beam
50: inter-vehicular distance control portion
60: lane keeping control portion
70: control portion
71: travel control portion
71a: image recognition portion
72: joining control portion
73: communication control portion
74: information sharing portion
74a: position information sharing portion
74b: identification information sharing portion
74c: state information sharing portion
80: presentation portion
81: main image display area
82: operation key display area
83: message display area
84: travel information display area
85: information display area
90: operation input portion
95: storage portion
100: convoy travel control apparatus
200: event
810: forward video display area
811: first interior video display area
812: second interior video display area
813: third interior video display area
820: first operation key
821: second operation key
822: third operation key
823: fourth operation key
824: fifth operation key
825: sixth operation key
826: seventh operation key
827: eighth operation key
828: ninth operation key

The invention claimed is:

1. A convoy travel control apparatus, comprising:
   a communication portion that communicates with another vehicle;
   a travel control portion that actualizes travel in convoy with the another vehicle through communication via the communication portion;
   a joining control portion;
   a forward imaging portion that takes an image of a preceding vehicle;
   an image recognition portion that, by recognizing an image taken by the forward imaging portion through image processing, recognizes an identification number allocated to the imaged preceding vehicle; and
   an identification information sharing portion that receives an identification number allocated to a convoy vehicle incorporated into the group of convoy vehicles, wherein:
   when an own vehicle is travelling in convoy, if the communication portion has received, from an independent vehicle not incorporated in group of convoy vehicles travelling in convoy, request information to incorporate the independent vehicle into the group of convoy vehicles, then the joining control portion exercises control, which is for incorporating the independent vehicle into the group of convoy vehicles, on the group of convoy vehicles via the communication portion, if the identification number allocated to the imaged preceding vehicle matches with the identification number allocated to the convoy vehicle, then the joining control portion determines that the imaged preceding vehicle is the convoy vehicle, if the independent vehicle is travelling behind the group of convoy vehicles, then the joining control portion decelerates the group of convoy vehicles, and if the independent vehicle is travelling in front of the group of convoy vehicles, then the joining control portion transmits, via the communication portion, information that requires to accelerate the group of convoy vehicles.

2. The convoy travel control apparatus according to claim 1, further comprising:

a sensor portion that measures an inter-vehicular distance between the own vehicle and a preceding vehicle;

an inter-vehicular distance control portion that controls a travel drive portion of the own vehicle so that the inter-vehicular distance measured by the sensor portion is a set distance; and a lane keeping control portion that controls a steering portion of the own vehicle so that the own vehicle does not deviate from a driving lane, wherein:

the joining control portion determines whether an inter-vehicular distance and a difference in speed between convoy vehicles incorporated in the group of convoy vehicles are within predetermined ranges or not, and if the inter-vehicular distance and the difference in speed between the convoy vehicles are within the predetermined ranges, then the travel control portion causes the own vehicle to travel in convoy based on control by the inter-vehicular distance control portion and on control by the lane keeping control portion.

3. The convoy travel control apparatus according to claim 2, wherein if the own vehicle is travelling in convoy, then the travel control portion orders the inter-vehicular distance control portion to perform inter-vehicular distance control with the set distance shorter than a case where the own vehicle is not travelling in convoy.

4. The convoy travel control apparatus according to claim 1, wherein:

if the independent vehicle is travelling behind the group of convoy vehicles, then the joining control portion generates information of speed change request that accelerates the independent vehicle, if the independent vehicle is travelling in front of the group of convoy vehicles, then the joining control portion generates information of speed change request that decelerates the independent vehicle, and the joining control portion transmits the generated information of speed change request to the independent vehicle via the communication portion.

5. The convoy travel control apparatus according to claim 1, further comprising a sensor portion that measures an inter-vehicular distance between the own vehicle and a preceding vehicle, wherein:

the joining control portion calculates a position of the preceding vehicle based on the inter-vehicular distance measured by the sensor portion, and if a distance between the calculated position of the preceding vehicle and a position of a convoy vehicle incorporated into the group of convoy vehicles is within a predetermined distance, then the joining control portion determines that the preceding vehicle is the convoy vehicle.

6. The convoy travel control apparatus according to claim 2, further comprising a state information sharing portion that receives information indicative of a state in front of or behind the group of convoy vehicles, wherein according to the information indicative of the state in front of or behind the group of convoy vehicles, the travel control portion controls travel of the group of convoy vehicles.

7. The convoy travel control apparatus according to claim 6, wherein if the information indicative of the state in front of or behind the group of convoy vehicles is information indicative of a predetermined event, then the travel control portion orders the inter-vehicular distance control portion to change the inter-vehicular distance.

8. The convoy travel control apparatus according to claim 6, wherein if the information indicative of the state in front of or behind the group of convoy vehicles is information indicative of a predetermined event, then the travel control portion orders the lane keeping control portion to change a position of the own vehicle with respect to a lane.

9. The convoy travel control apparatus according to claim 6, further comprising a communication control portion, wherein if the communication portion receives at least either of image information in which an interior of the convoy vehicle incorporated in the group of convoy vehicles is taken and voice information collected from the interior of the convoy vehicle, then according to the information indicative of the state in front of or behind the group of convoy vehicles, the communication control portion determines whether each in the group of convoy vehicles is capable of travelling safely or not, and the communication control portion controls the presentation portion so as to present at least either of the image information and the voice information.

10. The convoy travel control apparatus according to claim 9, wherein the communication control portion transmits voice information, which has been collected from the own vehicle, via the communication portion based on an operation input.

11. The convoy travel control apparatus according to claim 9, further comprising a storage portion that stores point information granted to a driver according to experience of driving the convoy vehicle, wherein the presentation portion presents the point information.

12. The convoy travel control apparatus according to claim 11, wherein the storage portion stores the point information granted to the driver according to the experience that satisfies a preset condition.

13. The convoy travel control apparatus according to claim 1, further comprising a position information sharing portion that receives information indicative of a trail of a preceding vehicle, wherein the travel control portion causes an own vehicle to follow the trail.

14. The convoy travel control apparatus according to claim 1, wherein:
the joining control portion determines a positional relationship between a position of the group of convoy vehicles and a position of the independent vehicle, and
according to the determined positional relationship, then the joining control portion exercises control, which is for incorporating the independent vehicle into the group of convoy vehicles, on the group of convoy vehicles via the communication portion.

15. The convoy travel control apparatus according to claim 9, wherein
if no other vehicles are present around the group of convoy vehicles, then the communication control portion determines whether each in the group of convoy vehicles is capable of travelling safely or not.

16. The convoy travel control apparatus according to claim 9, wherein
if a road shape ahead of the group of convoy vehicles is straight, then the communication control portion determines whether each in the group of convoy vehicles is capable of travelling safely or not.

17. The convoy travel control apparatus according to claim 1, wherein
if a timing indicated by a received lighting timing information matches with a timing at which a light source portion imaged by the forward imaging portion lights up, then the travel control portion determines that an imaged preceding vehicle is a communication vehicle.

18. The convoy travel control apparatus according to claim 1, wherein
if any one of the convoy vehicle ahead determines that there is not an obstacle ahead, then the travel control portion determines that there is not the obstacle in front of the own vehicle.

19. The convoy travel control apparatus according to claim 1, wherein
the driver of the independent vehicle is capable of selecting from which of front, rear, and side of the convoy vehicles incorporated in the group of convoy vehicles, the driver of the independent vehicle can merge with the group of convoy vehicles.

* * * * *